(12) United States Patent
Takemura

(10) Patent No.: US 12,518,644 B2
(45) Date of Patent: Jan. 6, 2026

(54) FLIGHT CONTROL DEVICE AND NON-TRANSITORY COMPUTER READABLE MEDIUM STORING FLIGHT CONTROL PROGRAM

(71) Applicant: DENSO CORPORATION, Kariya (JP)

(72) Inventor: Yuichi Takemura, Kariya (JP)

(73) Assignee: DENSO CORPORATION, Kariya (JP)

( * ) Notice: Subject to any disclaimer, the term of this patent is extended or adjusted under 35 U.S.C. 154(b) by 103 days.

(21) Appl. No.: 18/629,193

(22) Filed: Apr. 8, 2024

(65) Prior Publication Data
US 2024/0257655 A1    Aug. 1, 2024

Related U.S. Application Data

(63) Continuation of application No. PCT/JP2022/039014, filed on Oct. 20, 2022.

(30) Foreign Application Priority Data

Nov. 5, 2021    (JP) .................... 2021-181338

(51) Int. Cl.
| | |
|---|---|
| G08G 5/55 | (2025.01) |
| G08G 5/34 | (2025.01) |
| G08G 5/57 | (2025.01) |
| G08G 5/59 | (2025.01) |
| G08G 5/80 | (2025.01) |

(52) U.S. Cl.
CPC .................. G08G 5/55 (2025.01); G08G 5/34 (2025.01); G08G 5/57 (2025.01); G08G 5/59 (2025.01); G08G 5/80 (2025.01)

(58) Field of Classification Search
CPC ...... G08G 80/723; G08G 80/59; G08G 80/58; G08G 80/25; G08G 80/21; G08G 80/00; G01C 21/20; B64C 13/18
See application file for complete search history.

(56) References Cited

U.S. PATENT DOCUMENTS

| | | | |
|---|---|---|---|
| 2018/0231972 A1* | 8/2018 | Woon | G08G 5/55 |
| 2019/0361452 A1* | 11/2019 | Tahir | G05D 1/0214 |
| 2020/0027360 A1* | 1/2020 | Casey | G08G 5/26 |
| 2020/0369384 A1 | 11/2020 | Kelly | |
| 2021/0020052 A1 | 1/2021 | Nagai et al. | |
| 2021/0035459 A1* | 2/2021 | Yamada | G08G 5/53 |
| 2021/0043098 A1* | 2/2021 | Wang | G08G 5/21 |

(Continued)

FOREIGN PATENT DOCUMENTS

JP    2018-077754 A    5/2018

*Primary Examiner* — Wade Miles
*Assistant Examiner* — Zachary Joseph Wallace
(74) *Attorney, Agent, or Firm* — Oliff PLC

(57) ABSTRACT

A technique controls a subject aircraft which is a flight vehicle. In the technique, subject aircraft information is acquired as information on the subject aircraft, and counterpart aircraft information is acquired as information on a counterpart aircraft that is a flight vehicle different from the subject aircraft. A priority relationship is set according to the subject aircraft information and the counterpart aircraft information. The priority relationship indicates which of the subject aircraft and the counterpart aircraft has higher priority in performing collision avoidance flight that is flight for avoiding a collision between the subject aircraft and the counterpart aircraft.

21 Claims, 17 Drawing Sheets

(56) References Cited

U.S. PATENT DOCUMENTS

2021/0248913 A1  8/2021  Nagai et al.
2023/0109408 A1* 4/2023  Urushido ............... G05D 1/617
                                              701/3

* cited by examiner

FLIGHT CONTROL DEVICE AND NON-TRANSITORY COMPUTER READABLE MEDIUM STORING FLIGHT CONTROL PROGRAM

CROSS REFERENCE TO RELATED APPLICATIONS

The present application is a continuation application of International Patent Application No. PCT/JP2022/039014 filed on Oct. 20, 2022, which designated the U.S. and claims the benefit of priority from Japanese Patent Application No. 2021-181338 filed on Nov. 5, 2021. The entire disclosures of all of the above applications are incorporated herein by reference.

TECHNICAL FIELD

The present disclosure relates to a technique to control a flight vehicle.

BACKGROUND

A control device controls an unmanned aircraft. In this control device, a flight plan for causing the unmanned aircraft to fly is corrected so as to avoid collision between the unmanned aircraft and another aircraft.

SUMMARY

According to at least one embodiment of the present disclosure, a subject aircraft, which is a flight vehicle, is controlled. Subject aircraft information is acquired as information on the subject aircraft, and counterpart aircraft information is acquired as information on a counterpart aircraft that is a flight vehicle different from the subject aircraft. A priority relationship is set according to the subject aircraft information and the counterpart aircraft information, and the priority relationship indicates which of the subject aircraft and the counterpart aircraft has higher priority in performing collision avoidance flight that is flight for avoiding a collision between the subject aircraft and the counterpart aircraft.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
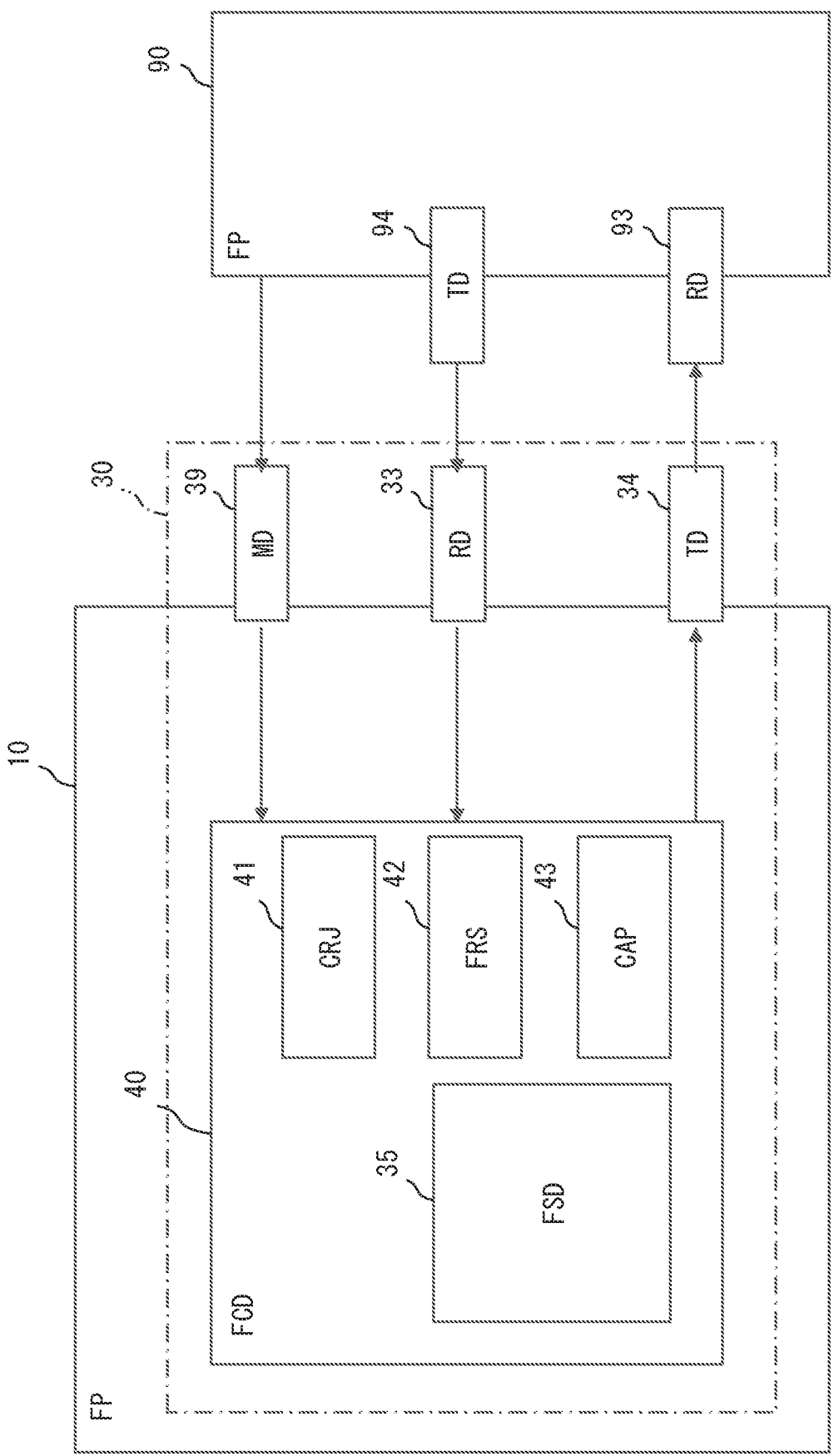
FIG. 1 is a block diagram illustrating an electrical configuration of a subject aircraft and a counterpart aircraft according to a first embodiment.

To begin with, examples of relevant techniques will be described. A control device according to a comparative example controls an unmanned aircraft. In this control device, a flight plan for causing the unmanned aircraft to fly is corrected so as to avoid collision between the unmanned aircraft and another aircraft. The correction of the flight plan is performed so that the unmanned aircraft can fly along the safest route.

However, according to the comparative example, when only one of two flight vehicles changes the flight route for collision avoidance, a burden of performing collision avoidance is biased to the one flight vehicle. In this case, there is a concern that a situation may occur in which only one flight vehicle performs collision avoidance while impairing safety of the one flight vehicle.

In contrast, according the present disclosure, a flight control device is capable of enhancing safety for each of two flight vehicles when avoiding collision between the two flight vehicles.

According to a first aspect disclosed herein, a flight control device is configured to be mounted on a subject aircraft, which is a flight vehicle, and configured to control the subject aircraft. The flight control device includes a subject aircraft acquisition unit configured to acquire subject aircraft information as information on the subject aircraft, a counterpart aircraft acquisition unit configured to acquire counterpart aircraft information as information on a counterpart aircraft that is a flight vehicle different from the subject aircraft, and a priority relationship setting unit configured to set, according to the subject aircraft information and the counterpart aircraft information, a priority relationship indicating which of the subject aircraft and the counterpart aircraft has higher priority in performing collision avoidance flight that is flight for avoiding a collision between the subject aircraft and the counterpart aircraft.

According to the first aspect, when a collision between the subject aircraft and the counterpart aircraft is predicted, the priority relationship indicating which of the subject aircraft and the counterpart aircraft has higher priority in performing the collision avoidance flight is set according to the subject aircraft information and the counterpart aircraft information. With this configuration, at least one of the subject aircraft and the counterpart aircraft performs the collision avoidance flight according to the priority relationship, and thus it is possible to avoid the collision in a mode in which the safety of each of the subject aircraft and the counterpart aircraft is not impaired. Therefore, it is possible to avoid a situation in which only one of the subject aircraft and the counterpart aircraft one-sidedly performs the collision avoidance flight and the safety of only one of the subject aircraft and the counterpart aircraft is impaired. Accordingly, in the case of avoiding a collision between two flight vehicles, that is, the subject aircraft and the counterpart aircraft, it is possible to enhance the safety for each of the two flight vehicles.

According to a second aspect disclosed herein, a flight control device is configured to be mounted on a subject aircraft, which is a flight vehicle, and configured to control the subject aircraft. The flight control device includes an information output unit configured to output subject aircraft information as information on the subject aircraft to a management facility that manages flight of the subject aircraft, and a priority relationship acquisition unit configured to acquire, through wireless communication with the management facility, a priority relationship indicating which of the subject aircraft and a counterpart aircraft different from the subject aircraft has higher priority in performing collision avoidance flight that is flight for avoiding a collision between the subject aircraft and the counterpart aircraft.

According to the second aspect, in avoiding a collision between the subject aircraft and the counterpart aircraft, the subject aircraft can acquire, through wireless communication with the management facility, the priority relationship indicating which of the subject aircraft and the counterpart aircraft has higher priority in performing the collision avoidance flight. Therefore, as in the first aspect, in the case of avoiding a collision between two flight vehicles, that is, the subject aircraft and the counterpart aircraft, it is possible to enhance the safety for each of the two flight vehicles.

Hereinafter, multiple embodiments will be described with reference to the drawings. Elements corresponding to each other among the embodiments are assigned the same numeral and their descriptions may be omitted. When only a part of a component is described in an embodiment, the other part of the component can be relied on the component of a preceding embodiment. Furthermore, in addition to the combination of components explicitly described in each embodiment, it is also possible to combine components from different embodiments, as long as the combination poses no difficulty, even if not explicitly described.

First Embodiment

A flight system 30 illustrated in FIG. 1 is mounted on a subject aircraft 10. The subject aircraft 10 is a flight vehicle such as an eVTOL. The eVTOL is an electric vertical take-off and landing aircraft. The electric vertical take-off and landing aircraft is an electric-powered vertical take-off and landing aircraft, and can take off and land vertically. The eVTOL is an abbreviation for electric vertical take-off and landing aircraft. The subject aircraft 10 is an electric aircraft flying in the atmosphere, and corresponds to a flight vehicle and an electric aircraft. The subject aircraft 10 is a manned flight vehicle carrying an occupant or an unmanned flight vehicle carrying no occupant. When the subject aircraft 10 is a manned flight vehicle, a pilot serving as an operator is counted as an occupant. The flight system 30 is a system driven to fly the subject aircraft 10. The flight system 30 may be referred to as a propulsion system. The manned flight vehicle and the unmanned flight vehicle may be referred to as a manned aircraft and an unmanned aircraft.

The flight system 30 includes a reception device 33, a transmission device 34, a monitoring device 39, and a flight control device 40. The flight control device 40 includes a storage device 35, a risk determination unit 41, a route setting unit 42, and a priority relationship setting unit 43. In FIG. 1, the subject aircraft 10 is denoted by FP, the reception device 33 by RD, the transmission device 34 by TD, the monitoring device 39 by MD, and the flight control device 40 by FCD. Further, the storage device 35 is denoted by FSD, the risk determination unit 41 by CRJ, the route setting unit 42 by FRS, and the priority relationship setting unit 43 by CAP.

The flight control device 40 is, for example, an ECU, and performs flight control for causing the subject aircraft 10 to fly. The flight control device 40 is a control device that controls the flight system 30. The ECU is an abbreviation for electronic control unit. The flight control device 40 is mainly implemented by a microcomputer including, for example, a processor, a memory, an I/O, and a bus that connects these components. The microcomputer may be referred to as a micro computer. The memory is a non-transitory tangible storage medium that non-temporarily stores computer readable programs and data. The non-transitory tangible storage medium is implemented by a semiconductor memory, a magnetic disk, or the like.

The flight control device 40 executes a control program stored in at least one of the memory and the storage device 35 to execute various types of processing related to the flight control. The flight control device 40 performs the flight control according to information acquired from the reception device 33, the monitoring device 39, and the like. The storage device 35 stores information on the flight control such as a control program. The storage device 35 includes a storage medium. The storage device 35 may be provided independently of the flight control device 40. In this case, it is preferable that the storage device 35 and the flight control device 40 can communicate with each other.

The flight control device 40 is electrically connected to the reception device 33, the transmission device 34, and the monitoring device 39. The reception device 33 and the transmission device 34 can wirelessly communicate with a communication object different from the subject aircraft 10. The reception device 33 can receive a signal from the communication object. The transmission device 34 can transmit a signal to the communication object. The flight control device 40 acquires information from the communication object via the reception device 33 and outputs information to the communication object via the transmission device 34. The reception device 33 and the transmission device 34 may be integrally provided as a communication device or the like. The reception device 33 corresponds to a receiving unit, and the transmission device 34 corresponds to a transmission unit.

The monitoring device 39 monitors the surroundings of the subject aircraft 10. The monitoring device 39 monitors other flight vehicles in the surroundings of the subject aircraft 10. When the subject aircraft 10 is flying, the monitoring device 39 monitors another flight vehicle in a surrounding airspace of the subject aircraft 10. The monitoring device 39 outputs information indicating a monitoring result to the flight control device 40. The monitoring result includes flight vehicle information on another flight vehicle in the surrounding airspace.

Referring to the other flight vehicle as a counterpart aircraft 90, there is a concern that the subject aircraft 10 and the counterpart aircraft 90 collide with each other. Therefore, the flight control device 40 performs collision avoidance control for avoiding a collision between the subject aircraft 10 and the counterpart aircraft 90. The collision between the subject aircraft 10 and the counterpart aircraft 90 includes contact between the subject aircraft 10 and the counterpart aircraft 90.

In the subject aircraft 10, subject aircraft information that is information on the subject aircraft 10 is stored in the storage device 35. The subject aircraft information is information necessary for the flight control device 40 to perform the flight control and the collision avoidance control. The subject aircraft information corresponds to flight vehicle information. Examples of the subject aircraft information include identification information, weight information, occupant information, abnormality information, and speed information. The identification information is information for identifying the subject aircraft 10. The identification information includes aircraft identification information for identifying an airframe of the subject aircraft 10, information indicating a type of the subject aircraft 10, and the like. The weight information is information on a weight of the subject aircraft 10. The weight information includes information on an aircraft weight of the subject aircraft 10. The identification information may directly or indirectly include information on the airframe, such as a size and a weight of the airframe.

The occupant information is information on an occupant of the subject aircraft 10. The occupant information includes information indicating whether an occupant is in the subject aircraft 10. That is, the occupant information includes information indicating whether the subject aircraft 10 is a manned flight vehicle or an unmanned flight vehicle. When an occupant is in the subject aircraft 10, the occupant information may include the number of occupants and the like. The abnormality information is information on an abnormality of the subject aircraft 10. The abnormality information includes information indicating whether an abnormality has occurred in the subject aircraft 10. That is, the abnormality information includes information indicating presence or absence of an abnormality in the subject aircraft 10. When an abnormality has occurred in the subject aircraft 10, the abnormality information may include information indicating contents of the abnormality. The speed information is information on a flight speed of the subject aircraft 10.

In the present embodiment, a flight vehicle capable of wirelessly communicating with a communication object different from the counterpart aircraft 90 is assumed as the counterpart aircraft 90. The counterpart aircraft 90 includes a reception device 93 and a transmission device 94. The reception device 93 can receive a signal from the communication object. The transmission device 94 can transmit a signal to the communication object. The subject aircraft 10 and the counterpart aircraft 90 can transmit and receive information via the reception devices 33 and 93 and the transmission devices 34 and 94. In FIG. 1, the counterpart aircraft 90 is denoted by FP, the reception device 93 by RD, and the transmission device 94 by TD.

Examples of the communication object with which the subject aircraft 10 can communicate include a management center in addition to the counterpart aircraft 90. The management center is a facility capable of managing the subject aircraft 10, and is, for example, a control center 155 (see FIG. 15). In the management center, a management system capable of managing the subject aircraft 10 is constructed. The management system includes a management device and a storage device. The management device is a control device that controls the management system. The storage device can store information necessary for managing the subject aircraft 10. The storage device may be provided in the management device.

When the subject aircraft 10 and the counterpart aircraft 90 can communicate with each other, the flight control device 40 acquires counterpart aircraft information, which is information on the counterpart aircraft 90, from the counterpart aircraft 90. The counterpart aircraft information is information necessary for the flight control device 40 to perform the collision avoidance control, similarly to the subject aircraft information. The counterpart aircraft information corresponds to the flight vehicle information. Examples of the counterpart aircraft information include identification information, priority information, flight route information, and position information. The identification information is information for identifying the counterpart aircraft 90. The identification information includes aircraft identification information for identifying an airframe of the counterpart aircraft 90 and information indicating a type of the counterpart aircraft 90. The identification information may directly or indirectly include information on the airframe of the counterpart aircraft 90, such as a size and a weight of the airframe.

The priority information is information on an avoidance priority of the counterpart aircraft 90. The avoidance priority is a degree of priority assigned to the counterpart aircraft 90 in performing collision avoidance to avoid a collision between the subject aircraft 10 and the counterpart aircraft 90. In the priority information, for example, a higher avoidance priority of the counterpart aircraft 90 indicates a higher possibility that the counterpart aircraft 90 performs the collision avoidance between the counterpart aircraft 90 and the subject aircraft 10. The flight route information is information on a flight route of the counterpart aircraft 90. The flight route information includes information indicating a flight route along which the counterpart aircraft 90 flies. The flight route includes at least one of a course and a path taken for the counterpart aircraft 90. The flight route may be referred to as a flight path. The position information is information on a position of the counterpart aircraft 90. The position information includes information indicating a current position of the counterpart aircraft 90, information indicating a current altitude of the counterpart aircraft 90, and the like.

The subject aircraft information used for the collision avoidance control performed by the flight control device 40 includes priority information, flight route information, position information, and the like in addition to the identification information and the like. The flight route information is information on a flight route of the subject aircraft 10. The flight route information includes information indicating a flight route along which the subject aircraft 10 flies. The flight route includes at least one of a course and a path taken by the subject aircraft 10. The position information is information on a position of the subject aircraft 10. The position information includes information indicating a current position of the subject aircraft 10, information indicating a current altitude of the subject aircraft 10, and the like.

The priority information is information related to an avoidance priority of the subject aircraft 10. The avoidance priority is a degree of priority assigned to the subject aircraft 10 in performing collision avoidance between the subject aircraft 10 and the counterpart aircraft 90. In the priority information, for example, a higher avoidance priority of the subject aircraft 10 indicates a higher possibility that the subject aircraft 10 performs the collision avoidance between the subject aircraft 10 and the counterpart aircraft 90.

The subject aircraft information includes fixed information and variable information. The fixed information is invariable information unique to the subject aircraft 10, and is information that is unlikely to vary. Examples of the fixed information include the aircraft weight of the subject aircraft 10. The fixed information corresponds to unique information. The variable information is information that varies with respect to the subject aircraft 10. Examples of the variable information include information indicating an additional weight of the subject aircraft 10 and the speed information of the subject aircraft 10. Examples of the additional weight of the subject aircraft 10 include the number of occupants in the subject aircraft 10 and a total weight of loads loaded on the subject aircraft 10. Examples of the load include a cargo.

The avoidance priority is set as an index according to the subject aircraft information. The avoidance priority is set according to both the fixed information and the variable information of the subject aircraft 10. The avoidance priority includes a fixed priority set according to the fixed information. The avoidance priority is calculated by correcting the fixed priority according to the variable information. The fixed priority is an avoidance priority initially set for the subject aircraft 10.

The fixed priority is set according to, for example, the aircraft weight of the subject aircraft 10, whether the subject aircraft 10 is an unmanned aircraft, whether the subject aircraft 10 can take off and land vertically, and a propulsion mechanism of the subject aircraft 10. For example, the fixed priority is set to be high on the assumption that a collision is avoided more easily as the aircraft weight of the subject aircraft 10 is lighter. When the subject aircraft 10 is an unmanned flight vehicle, the fixed priority is set to be high on the assumption that collision avoidance is easier than when the subject aircraft 10 is a manned flight vehicle. When the subject aircraft 10 is capable of vertical take-off and landing, the fixed priority is set to be high on the assumption that collision avoidance is easier than when the subject aircraft 10 is incapable of vertical take-off and landing.

The fixed priority may be set such that the influence of the aircraft weight is greater than that of other fixed information. When the weight of a flight vehicle such as the subject aircraft 10 is assumed to be tens of kilograms to hundreds of tons, it is considered that collision avoidance through course change is more difficult for a flight vehicle having an aircraft weight on the order of ton such as hundreds of tons than for a flight vehicle having an aircraft weight on the order of kilogram such as tens of kilograms. Therefore, with respect to a flight vehicle whose aircraft weight is fairly large or small so that the order of weight thereof is different from that of another flight vehicle, it is preferable to set the fixed priority such that the influence of the aircraft weight is so great that the increase or decrease of the fixed priority due to other fixed information does not make a difference.

In the subject aircraft 10, a propulsion mechanism for propelling the subject aircraft 10 differs depending on whether vertical take-off and landing is possible. For example, when the subject aircraft 10 is a vertical take-off and landing aircraft, a propulsion mechanism that enables vertical take-off and landing is mounted on the subject aircraft 10. When the subject aircraft 10 is not a vertical take-off and landing aircraft, the subject aircraft 10 is equipped with a propulsion mechanism that cannot perform vertical take-off and landing. Further, the propulsion mechanism differs depending on the type of the vertical take-off and landing aircraft. For example, when the subject aircraft 10 is a tiltrotor aircraft, one rotor serves as both a lift rotor for performing vertical take-off and landing and a cruise rotor for cruise. On the other hand, when the subject aircraft 10 is not a tiltrotor aircraft, the lift rotor and the cruise rotor cannot be implemented by a single rotor. In this case, the lift rotor and the cruise rotor are separately mounted on the subject aircraft 10. As described above, even in the vertical take-off and landing aircraft, the propulsion mechanism differs depending on whether the aircraft is a tiltrotor aircraft.

For example, when the subject aircraft 10 has an airframe including a propulsion mechanism with which the subject aircraft 10 easily ascends and descends, the fixed priority is set to be high on the assumption that collision avoidance is easier than when the subject aircraft 10 has an airframe including a propulsion mechanism with which it is difficult for the subject aircraft 10 to ascend and descend. In addition, when the subject aircraft 10 has an airframe in which one rotor serves as both the lift rotor and the cruise rotor, the fixed priority is set to be low on the assumption that the time required for collision avoidance is longer than when the subject aircraft 10 has an airframe in which the lift rotor and the cruise rotor are provided separately.

At least a part of the fixed information is stored in the storage device 35. For example, of the fixed information, information indicating the aircraft weight of the subject aircraft 10 is stored in the storage device 35. Information indicating the fixed priority is stored in the storage device 35 as the fixed information. At least a part of the fixed information may be stored in the storage device of the management center.

The flight control device 40 performs the collision avoidance control using the subject aircraft information and the counterpart aircraft information. The flight control device 40 includes the risk determination unit 41, the route setting unit 42, and the priority relationship setting unit 43 as functional blocks for performing the collision avoidance control. The functional block may be implemented by hardware such as at least one IC, or may be implemented by a combination of software execution by a processor and hardware.

The risk determination unit 41 determines a risk of collision between the subject aircraft 10 and the counterpart aircraft 90. The risk of collision is, for example, a possibility of collision between the subject aircraft 10 and the counterpart aircraft 90. For example, the risk determination unit 41 determines whether there is a risk of collision between the subject aircraft 10 and the counterpart aircraft 90. That is, the risk determination unit 41 determines whether the counterpart aircraft 90 posing a risk of collision with the subject aircraft 10 is present. For example, when the course of the subject aircraft 10 and the course of the counterpart aircraft 90 approach, intersect, or coincide with each other at a predetermined timing, the risk determination unit 41 determines that there is a risk of collision.

The route setting unit 42 sets a flight route along which the subject aircraft 10 flies. The route setting unit 42 can reset the flight route. For example, when there is no risk of collision between the subject aircraft 10 and the counterpart aircraft 90, the route setting unit 42 sets a flight route for causing the subject aircraft 10 to reach a destination. When there is a risk of collision between the subject aircraft 10 and the counterpart aircraft 90 and the subject aircraft 10 needs to avoid the collision, the route setting unit 42 resets the flight route so as to avoid the collision between the subject aircraft 10 and the counterpart aircraft 90. In this case, the route setting unit 42 changes the flight route.

The priority relationship setting unit 43 calculates a priority relationship for avoiding the collision between the subject aircraft 10 and the counterpart aircraft 90. The priority relationship is information indicating which of the subject aircraft 10 and the counterpart aircraft 90 has higher priority in performing collision avoidance. The priority relationship is, for example, an order of priority set for the subject aircraft 10 and the counterpart aircraft 90. In the priority relationship, it is indicated that, of the subject aircraft 10 and the counterpart aircraft 90, one having a higher order of priority for collision avoidance performs collision avoidance between the subject aircraft 10 and the counterpart aircraft 90. As a method of avoiding a collision, for example, there is a method of changing the flight route of only the subject aircraft 10 or the counterpart aircraft 90 having a higher order of priority.

The flight control device 40 performs flight control processing for causing the subject aircraft 10 to fly. The flight control processing will be described with reference to flowcharts of FIGS. 2 to 6. The flight control device 40 repeatedly executes the flight control processing at a predetermined control cycle. The flight control device 40 has a function of executing processing of each step in the flight control processing.

Figure 2:
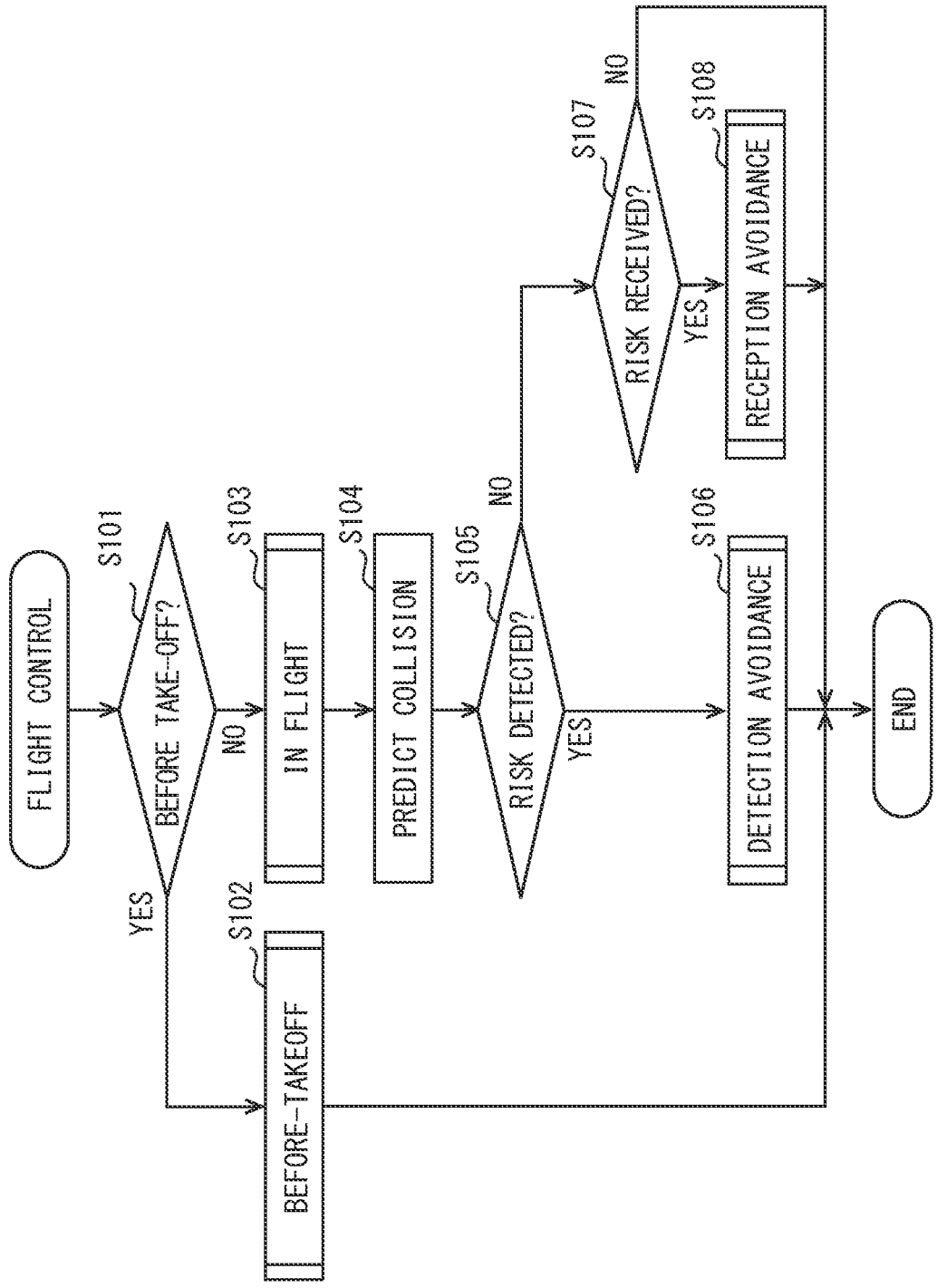
FIG. 2 is a flowchart illustrating a procedure of flight control processing.
Figure 3:
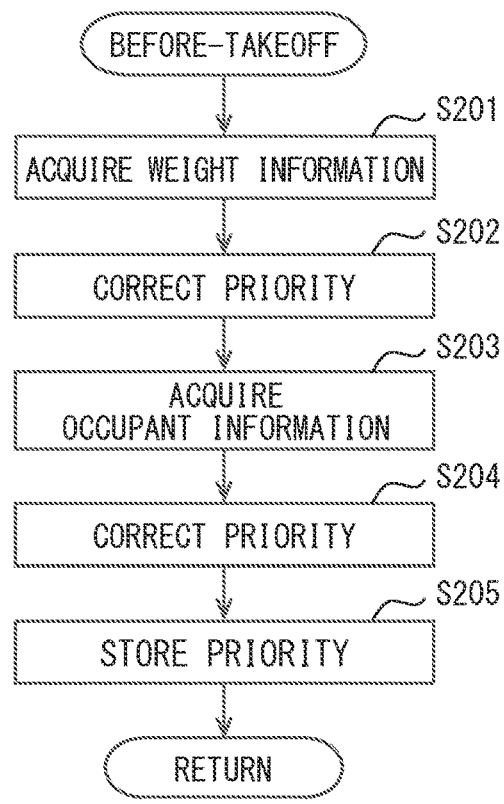
FIG. 3 is a flowchart illustrating a procedure of take-off preprocessing.
Figure 4:
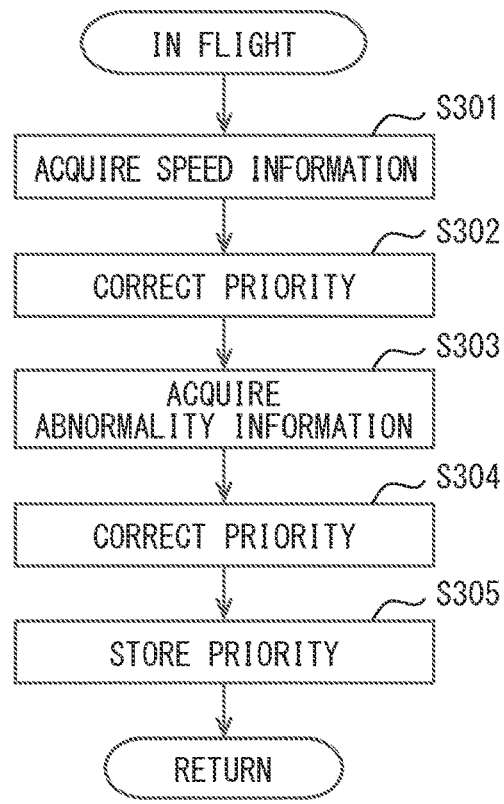
FIG. 4 is a flowchart illustrating a procedure of in-flight processing.
Figure 5:
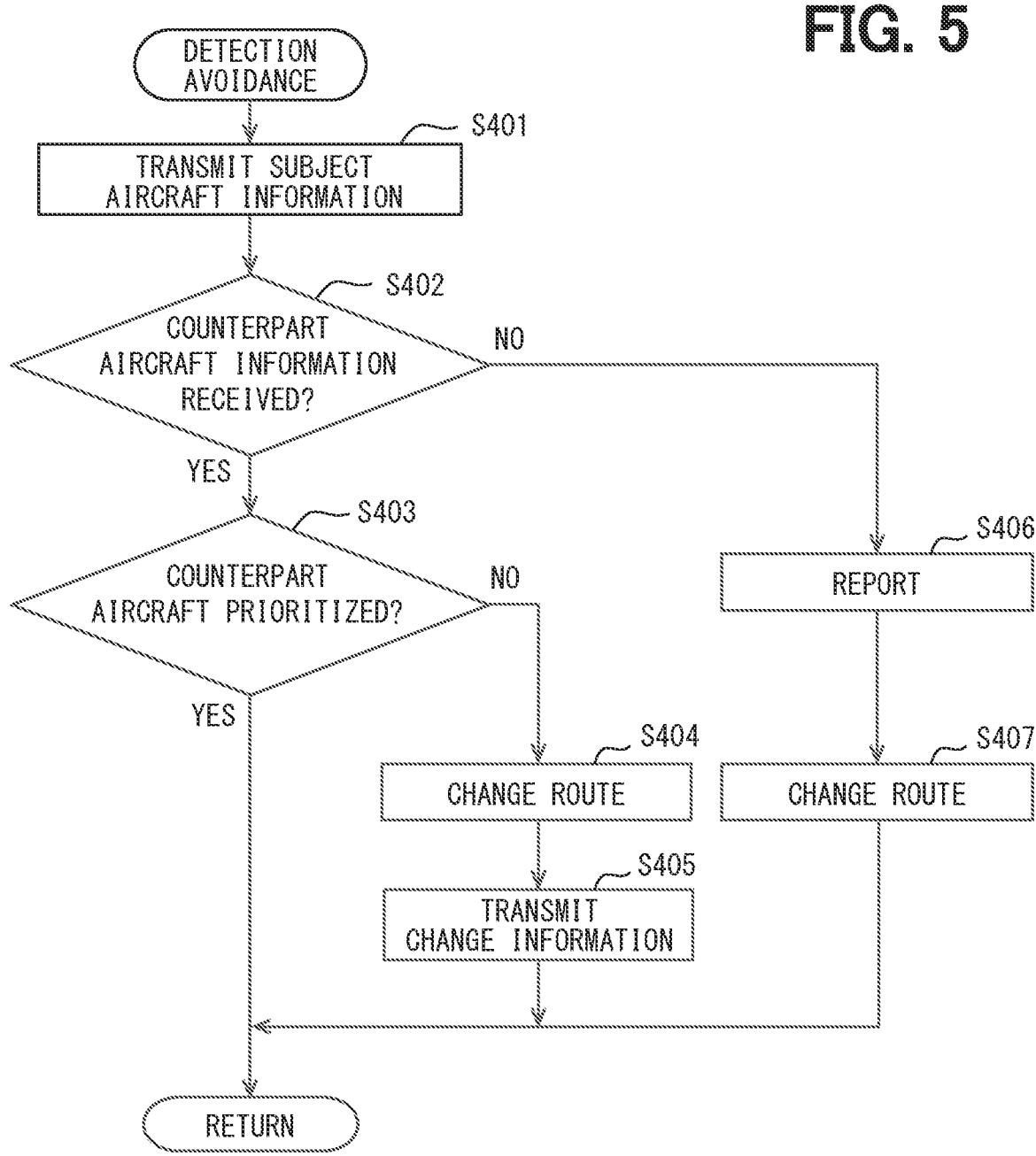
FIG. 5 is a flowchart illustrating a procedure of detection avoidance processing.
Figure 6:
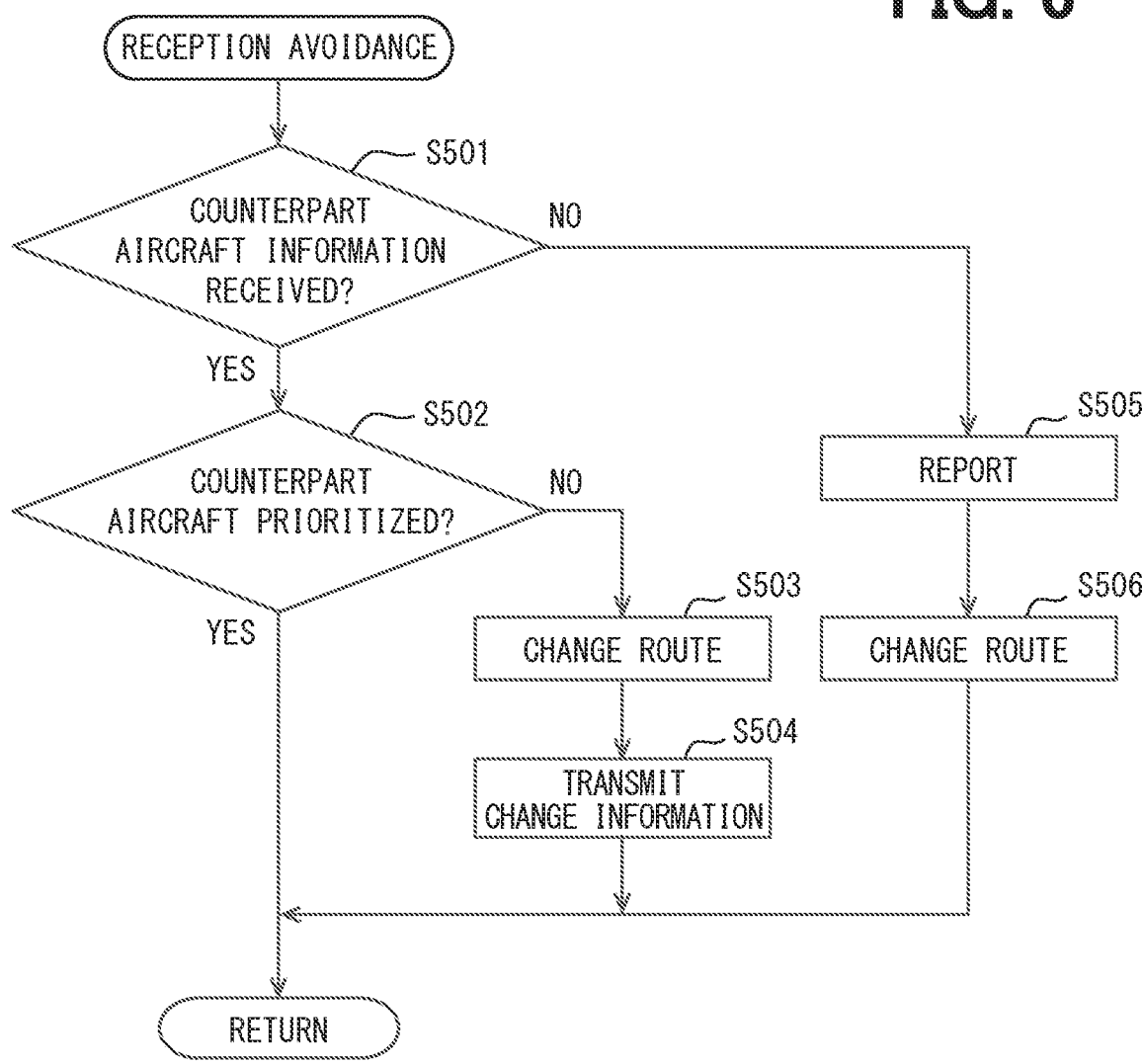
FIG. 6 is a flowchart illustrating a procedure of reception avoidance processing.

In step S101 illustrated in FIG. 2, the flight control device 40 determines whether the subject aircraft 10 is in a stage before take-off. When the subject aircraft 10 is in a stage before take-off, the flight control device 40 determines that the subject aircraft 10 is not flying, and proceeds to step S102. The flight control device 40 performs before-takeoff processing in step S102. The before-takeoff processing is processing of acquiring the avoidance priority by correcting the fixed priority according to the variable information before take-off of the subject aircraft 10. This processing is also processing of updating the avoidance priority by correcting the avoidance priority according to the variable information. The flight control device 40 may calculate the fixed priority according to the fixed information of the subject aircraft 10 in the before-takeoff processing. The before-takeoff processing will be described with reference to the flowchart shown in FIG. 3.

The flight control device 40 acquires the weight information of the subject aircraft 10 in step S201 of the before-takeoff processing. The weight information includes information on the weight of loads as the variable information. The function of the flight control device 40 executing the processing of step S201 corresponds to a subject aircraft acquisition unit.

In step S202, the flight control device 40 corrects and updates the avoidance priority according to the weight information of the subject aircraft 10. That is, the fixed priority is corrected using the weight information of the subject aircraft 10. The flight control device 40 corrects the fixed priority according to a total weight of the loads, for example, and acquires the correction result as the avoidance priority. For example, the flight control device 40 corrects the avoidance priority to be lower, assuming that the collision avoidance is more difficult as the total weight of the loads is larger. The function of the flight control device 40 executing the processing of step S202 corresponds to a priority setting unit and a subject aircraft setting unit.

In step S203, the flight control device 40 acquires the occupant information of the subject aircraft 10. The occupant information includes information on the number of occupants in the subject aircraft 10 as the variable information. The function of the flight control device 40 executing the processing of step S203 corresponds to the subject aircraft acquisition unit.

In step S204, the flight control device 40 corrects and updates the avoidance priority using the occupant information of the subject aircraft 10. That is, the fixed priority is corrected using the occupant information of the subject aircraft 10. The flight control device 40 further corrects the avoidance priority corrected in step S202 according to, for example, the number of occupants, and acquires the correction result as the avoidance priority. For example, the flight control device 40 corrects the avoidance priority to be lower, assuming that the collision avoidance is more difficult as the number of occupants is larger. The number of occupants is information indicating a total weight of the occupants. Therefore, the avoidance priority is corrected using the total weight of the occupants. The function of the flight control device 40 executing the processing of step S204 corresponds to the priority setting unit and the subject aircraft setting unit.

In step S205, the flight control device 40 stores the avoidance priority corrected in step S204 in the storage device 35.

Referring back to FIG. 2, in step S101, when the subject aircraft 10 is not in a stage before take-off, the flight control device 40 proceeds to step S103, assuming that the subject aircraft 10 is in flight. The flight control device 40 performs in-flight processing in step S103. The in-flight processing is processing of acquiring the avoidance priority by correcting the fixed priority according to the variable information while the subject aircraft 10 is in flight. This processing is also processing of updating the avoidance priority by correcting the avoidance priority according to the variable information. The in-flight processing will be described with reference to the flowchart shown in FIG. 4.

In step S301 of the in-flight processing, the flight control device 40 acquires the speed information of the subject aircraft 10. The speed information includes information indicating a current flight speed of the subject aircraft 10 as the variable information. The function of the flight control device 40 executing the processing of step S301 corresponds to the subject aircraft acquisition unit.

In step S302, the flight control device 40 corrects and updates the avoidance priority using the speed information of the subject aircraft 10. That is, the fixed priority is corrected using the speed information of the subject aircraft 10. The flight control device 40 reads information on the avoidance priority from the storage device 35, corrects the avoidance priority according to the flight speed of the subject aircraft 10, and acquires the correction result as the avoidance priority. For example, the flight control device 40 corrects the avoidance priority to be lower, assuming that the collision avoidance is more difficult as the flight speed of the subject aircraft 10 is larger. The function of the flight control device 40 executing the processing of step S302 corresponds to the priority setting unit and the subject aircraft setting unit.

In step S303, the flight control device 40 acquires the abnormality information of the subject aircraft 10. The abnormality information includes, as the variable information, information indicating presence or absence of an abnormality in the subject aircraft 10 and contents of the abnormality. The function of the flight control device 40 executing the processing of step S303 corresponds to the subject aircraft acquisition unit.

In step S304, the flight control device 40 corrects and updates the avoidance priority using the abnormality information of the subject aircraft 10. That is, the fixed priority is corrected using the abnormality information of the subject aircraft 10. The flight control device 40 further corrects the avoidance priority corrected in step S302 according to the presence or absence of the abnormality and the contents of the abnormality, and acquires the correction result as the avoidance priority. The flight control device 40 corrects the avoidance priority to be lower, assuming that the collision avoidance is difficult when an abnormality has occurred in the subject aircraft 10. The function of the flight control device 40 executing the processing of step S304 corresponds to the priority setting unit and the subject aircraft setting unit.

In step S305, the flight control device 40 stores the avoidance priority corrected in step S304 in the storage device 35.

Returning to FIG. 2, after step S103, the flight control device 40 proceeds to step S104, and performs collision prediction. The flight control device 40 predicts whether the subject aircraft 10 will collide with the counterpart aircraft 90. For example, the flight control device 40 predicts the possibility that the course of the subject aircraft 10 and the course of the counterpart aircraft 90 approach, intersect, or coincide with each other at a predetermined timing. When it is predicted that the possibility is high, it is predicted that a possibility of collision between the subject aircraft 10 and the counterpart aircraft 90 is high. The function of the flight control device 40 executing the processing of step S104 corresponds to a collision prediction unit.

In step S105, the flight control device 40 determines whether a risk of collision has been detected. That is, the flight control device 40 determines whether the counterpart aircraft 90 posing a risk of collision has been detected. The flight control device 40 determines whether the possibility of collision between the subject aircraft 10 and the counterpart aircraft 90 is higher than a predetermined reference. When the possibility of collision is higher than the predetermined reference, the flight control device 40 assumes that a risk of collision has been detected, and proceeds to step S106. The detection of a risk of collision is also detection of a flight vehicle posing the risk of collision. The function of executing the processing of step S105 corresponds to the risk determination unit 41.

The flight control device 40 performs detection avoidance processing in step S106. The detection avoidance processing is processing for avoiding a risk of collision when the subject aircraft 10 has detected a risk of collision using the flight control device 40. To avoid a risk of collision is to avoid a collision between the subject aircraft 10 and the counterpart aircraft 90. The detection avoidance processing will be described with reference to the flowchart shown in FIG. 5.

In step S401 of the detection avoidance processing, the flight control device 40 transmits the subject aircraft information. The flight control device 40 transmits the subject aircraft information from the transmission device 34 to the counterpart aircraft 90. The subject aircraft information includes, for example, the priority information on the avoidance priority of the subject aircraft 10. The flight control device 40 may transmit the subject aircraft information to the management center. When a flight vehicle other than the counterpart aircraft 90 is present around the subject aircraft 10, the flight control device 40 may transmit the subject aircraft information to the flight vehicle. The function of the flight control device 40 executing the processing of step S401 corresponds to a transmission execution unit.

In step S402, the flight control device 40 determines whether the counterpart aircraft information is received. The counterpart aircraft information includes, for example, the priority information on the avoidance priority of the counterpart aircraft 90. The flight control device 40 measures, for example, an elapsed time from the transmission of the subject aircraft information, and determines whether the counterpart aircraft information is received from the counterpart aircraft 90 before the elapsed time reaches a predetermined determination time. When the counterpart aircraft information is received from the counterpart aircraft 90 before the elapsed time reaches the determination time, the flight control device 40 proceeds to step S403. When the counterpart aircraft information is not received from the counterpart aircraft 90 before the elapsed time reaches the determination time, the flight control device 40 determines that the counterpart aircraft information cannot be received. The function of the flight control device 40 executing the processing of step S402 corresponds to the priority setting unit and a reception execution unit.

When the information indicating the avoidance priority is included in the counterpart aircraft information, the flight control device 40 sets the avoidance priority of the counterpart aircraft 90 by acquiring the information indicating the avoidance priority. When the information indicating the avoidance priority is not included in the counterpart aircraft information, the flight control device 40 sets the avoidance priority of the counterpart aircraft 90 according to the counterpart aircraft information. The flight control device 40 sets the avoidance priority of the counterpart aircraft 90 according to the counterpart aircraft information, similarly to the setting of the avoidance priority of the subject aircraft 10 according to the subject aircraft information. For example, the flight control device 40 calculates the fixed priority as the avoidance priority according to fixed information of the counterpart aircraft 90. Then, similar to steps S102 and S103 for the subject aircraft 10, the flight control device 40 corrects and updates the avoidance priority for the counterpart aircraft 90 according to variable information thereof.

When the counterpart aircraft information cannot be received in step S402, the flight control device 40 acquires, as the counterpart aircraft information, information indicating that the counterpart aircraft information cannot be received. In this case, the flight control device 40 sets the avoidance priority for the counterpart aircraft 90 according to the counterpart aircraft information indicating that the counterpart aircraft information could not be received. The flight control device 40 may acquire a current flight speed or the like of the counterpart aircraft 90 as the counterpart aircraft information and set the avoidance priority according to the current flight speed or the like. The function of the flight control device 40 executing the processing of step S402 corresponds to a counterpart aircraft acquisition unit and a counterpart aircraft setting unit.

In step S403, the flight control device 40 sets a priority relationship between the subject aircraft 10 and the counterpart aircraft 90 according to the subject aircraft information and the counterpart aircraft information. The function of the flight control device 40 executing the processing of step S403 corresponds to a priority relationship setting unit. The flight control device 40 determines which of the subject aircraft 10 and the counterpart aircraft 90 has a higher order of priority for collision avoidance in the priority relationship between the subject aircraft 10 and the counterpart aircraft

90. For example, the flight control device 40 determines whether the order of priority of the counterpart aircraft 90 is higher than the order of priority of the subject aircraft 10 in collision avoidance. When the avoidance priority of the counterpart aircraft 90 is higher than the avoidance priority of the subject aircraft 10, the flight control device 40 determines that the order of priority of the counterpart aircraft 90 is higher than the order of priority of the subject aircraft 10 in collision avoidance.

When the order of priority of the counterpart aircraft 90 is higher than that of the subject aircraft 10, the flight control device 40 ends the detection avoidance processing as it is, and also ends the flight control processing. In this case, the counterpart aircraft 90 performs collision avoidance flight for avoiding a collision between the subject aircraft 10 and the counterpart aircraft 90. On the other hand, the subject aircraft 10 does not perform the collision avoidance flight and continues the flight without changing the current flight route. The collision avoidance flight may be referred to as a collision avoidance action. When the counterpart aircraft 90 has a higher order of priority than the subject aircraft 10, the flight control device 40 may transmit, to the counterpart aircraft 90, information indicating that the subject aircraft 10 does not perform the collision avoidance flight.

When the order of priority of the counterpart aircraft 90 is not higher than the order of priority of the subject aircraft 10 in collision avoidance, the flight control device 40 proceeds to step S404. In step S404, the flight control device 40 changes the flight route of the subject aircraft 10. The flight control device 40 acquires the flight route of the counterpart aircraft 90 using the flight route information or the like included in the counterpart aircraft information. Then, the flight control device 40 changes the flight route of the subject aircraft 10 according to the flight route of the counterpart aircraft 90 so as to eliminate the risk of collision between the subject aircraft 10 and the counterpart aircraft 90. The flight route is changed to a collision avoidance route for performing the collision avoidance flight. The collision avoidance route is a flight route in which the risk of collision with the counterpart aircraft 90 is eliminated. The flight control device 40 performs the collision avoidance control for causing the subject aircraft 10 to fly along the collision avoidance route. The function of the flight control device 40 executing the processing of step S404 corresponds to the route setting unit 42.

In step S405, the flight control device 40 transmits change information to the counterpart aircraft 90. The change information is information indicating that the flight route of the subject aircraft 10 has been changed. The change information includes information indicating the collision avoidance route of the subject aircraft 10.

In step S402, when the counterpart aircraft information cannot be received from the counterpart aircraft 90, the flight control device 40 proceeds to step S406. The flight control device 40 performs report processing in step S406. In the report processing, the flight control device 40 transmits, to the management center, report information for reporting the presence of the counterpart aircraft 90. The report information includes information indicating that there is no response from the counterpart aircraft 90, information indicating that the counterpart aircraft 90 is a suspicious aircraft, and the like. When a flight vehicle other than the counterpart aircraft 90 is present around the subject aircraft 10, the flight control device 40 may transmit the report information to the flight vehicle.

In step S407, the flight control device 40 changes the flight route of the subject aircraft 10. The flight control device 40 acquires a flight state of the counterpart aircraft 90 using the monitoring result of the monitoring device 39 or the like, and calculates the flight route of the counterpart aircraft 90 as an estimated route according to the flight state. Then, the flight control device 40 changes the flight route of the subject aircraft 10 according to the estimated route of the counterpart aircraft 90 to eliminate the risk of collision between the subject aircraft 10 and the counterpart aircraft 90. The flight route is changed to a warning route for avoiding the collision with the counterpart aircraft 90. Since the flight route of the counterpart aircraft 90 is unknown due to the fact that the counterpart aircraft information cannot be acquired, the warning route is a flight route largely avoiding the counterpart aircraft 90 by warning the counterpart aircraft 90. For example, the warning route is set to have a larger separation distance from the counterpart aircraft 90 than the collision avoidance route set in step S404. The warning route is a type of collision avoidance route. The flight control device 40 performs the collision avoidance control for causing the subject aircraft 10 to fly along the warning route. The function of the flight control device 40 executing the processing of step S407 corresponds to the route setting unit 42.

Referring back to FIG. 2, when no risk of collision is detected in step S105, the flight control device 40 proceeds to step S107. The flight control device 40 determines whether information indicating a risk of collision is received in step S107. When the counterpart aircraft 90 detects a risk of collision between the subject aircraft 10 and the counterpart aircraft 90 and the counterpart aircraft 90 transmits a notification that a risk of collision is detected to the subject aircraft 10, the subject aircraft 10 receives the information indicating a risk of collision. The function of the flight control device 40 executing the processing of step S107 corresponds to the reception execution unit. When the information indicating a risk of collision is not received, the flight control device 40 ends the flight control processing as it is.

When the information indicating a risk of collision is received, the flight control device 40 proceeds to step S108 and performs reception avoidance processing. The reception avoidance processing is processing for avoiding a risk of collision when the risk of collision is detected by the counterpart aircraft 90. The reception avoidance processing will be described with reference to the flowchart shown in FIG. 6.

In step S501 of the reception avoidance processing, the flight control device 40 determines whether the counterpart aircraft information is received. For example, when the counterpart aircraft information is included in the information indicating a risk of collision, the counterpart aircraft information is received by receiving the information indicating a risk of collision. The counterpart aircraft information includes, for example, the priority information of the counterpart aircraft 90. The function of the flight control device 40 executing the processing of step S501 corresponds to the priority setting unit and the reception execution unit.

When the counterpart aircraft information is received, the flight control device 40 proceeds to step S502. The flight control device 40 sets the avoidance priority for the counterpart aircraft 90 similarly to step S402 regardless of whether the information indicating the avoidance priority is included in the counterpart aircraft information.

When the counterpart aircraft information cannot be received in step S501, the flight control device 40 acquires, as the counterpart aircraft information, information indicating that the counterpart aircraft information cannot be received. In this case, similarly to step S402, the flight control device 40 sets the avoidance priority for the counterpart aircraft 90 according to the counterpart aircraft information indicating that the counterpart aircraft information cannot be received. The function of the flight control device 40 executing the processing of step S501 corresponds to the counterpart aircraft acquisition unit and the counterpart aircraft setting unit.

In step S502, similarly to step S403, flight control device 40 calculates the priority relationship between the subject aircraft 10 and the counterpart aircraft 90 according to the subject aircraft information and the counterpart aircraft information. Similarly to step S403, the flight control device 40 determines whether the order of priority of the counterpart aircraft 90 is higher than the order of priority of the subject aircraft 10 in collision avoidance. The function of the flight control device 40 executing the processing of step S502 corresponds to a priority relationship setting unit. When the order of priority of the counterpart aircraft 90 is higher than that of the subject aircraft 10, the flight control device 40 ends the reception avoidance processing similarly to the detection avoidance processing in step S106 and ends the flight control processing.

When the order of priority of the counterpart aircraft 90 is not higher than the order of priority of the subject aircraft 10 in collision avoidance, the flight control device 40 proceeds to step S503. In step S503, the flight control device 40 changes the flight route of the subject aircraft 10 and performs the collision avoidance control, similarly to step S404. The function of the flight control device 40 executing the processing of step S503 corresponds to the route setting unit 42. In step S504, similarly to step S405, the flight control device 40 transmits the change information to the counterpart aircraft 90.

In step S501, when the counterpart aircraft information cannot be received from the counterpart aircraft 90, the flight control device 40 proceeds to step S505. In step S505, the flight control device 40 performs the report processing similarly to step S406. In step S506, the flight control device 40 changes the flight route of the subject aircraft 10 similarly to step S407. Similarly to step S407, the function of the flight control device 40 executing the processing of step S506 corresponds to the route setting unit 42.

Next, the order of priority in collision avoidance will be collectively described from the perspective of safety. In collision avoidance for two aircrafts of the subject aircraft 10 and the counterpart aircraft 90, a sudden course change of the manned aircraft is likely to pose a risk of causing an injury or an uncomfortable feeling to an occupant due to a sudden change in a centrifugal force, an acceleration degree, or the like. Therefore, by changing the course of the unmanned aircraft, it is possible to reduce the risk regarding the safety of the occupant. In addition, when a cargo is loaded on the airframe as the loads, a sudden course change is likely to pose a risk such as breaking the cargo. Therefore, since the course of one of the subject aircraft 10 and the counterpart aircraft 90 on which no cargo is loaded is changed, breakage of the cargo is less likely to occur and safety is secured. Further, in the case of an airframe in which some abnormality has occurred, there is a possibility that an appropriate course change cannot be performed. Therefore, by changing the course of the normal airframe, the collision can be avoided more reliably and safety is secured.

The order of priority in collision avoidance will be collectively described from the perspective of flight quality. Examples of the flight quality include ease and efficiency in the course change. In collision avoidance for the two aircrafts of the subject aircraft 10 and the counterpart aircraft 90, a heavier airframe requires a larger amount of energy for the course change. Therefore, by changing the course of the lighter airframe, the energy required for the course change is easily reduced, which is efficient. In addition, the airframe flying at a high speed requires a large amount of energy for the course change, and the influence of centrifugal force or the like tends to increase when the course is changed. For example, in a case where the course of the airframe is a curved course for flying, when the course change is performed such that the curve is steeper, the centrifugal force tends to be large. Therefore, by changing the course of the airframe flying at a lower speed, the course change can be performed easily and safely. Further, the airframe that is incapable of vertical take-off and landing tends to have a smaller adjustment allowance for the course change than the airframe that is capable of vertical take-off and landing. Therefore, by changing the course of the airframe capable of vertical take-off and landing, the course change can be easily performed.

Regarding the order of priority in collision avoidance, it is preferable that safety is considered to be more important than flight quality. Therefore, when setting the order of priority for the subject aircraft 10 and the counterpart aircraft 90, there is a method of increasing the weighting for setting the avoidance priority for information satisfying the perspective of safety. Examples of the information satisfying the perspective of safety include the occupant information, the weight information, and the abnormality information as described above. Further, there is a method of calculating avoidance priorities for various types of information respectively and setting a comprehensive avoidance priority while comparing the avoidance priorities in descending order of importance. The importance is importance in satisfying the perspective of safety.

According to the present embodiment described above, for a collision between the subject aircraft 10 and the counterpart aircraft 90, the priority relationship indicating which of the subject aircraft 10 and the counterpart aircraft 90 has higher priority in performing the collision avoidance flight is set according to the subject aircraft information and the counterpart aircraft information. With this configuration, one of the subject aircraft 10 and the counterpart aircraft 90 performs the collision avoidance flight according to the priority relationship, and thus it is possible to avoid the collision in a mode in which safety of each of the subject aircraft 10 and the counterpart aircraft 90 is not impaired. Therefore, it is possible to restrict a situation in which only one of the subject aircraft 10 and the counterpart aircraft 90 one-sidedly performs the collision avoidance flight and the safety of one of the subject aircraft 10 and the counterpart aircraft 90 is impaired. That is, in this way, the subject aircraft 10 and the counterpart aircraft 90 can cooperate to avoid a collision. Accordingly, in the case of avoiding a collision between two flight vehicles, that is, the subject aircraft 10 and the counterpart aircraft 90, it is possible to enhance safety for each of the two flight vehicles.

According to the present embodiment, the avoidance priorities indicating degrees of priority assigned to the flight vehicles of the subject aircraft 10 and the counterpart aircraft 90 in performing the change of the flight route for avoiding a collision are set according to the flight vehicle information, that is, the subject aircraft information and the counterpart aircraft information. With this configuration, since the avoidance priorities can be set in advance for the flight vehicles, the flight vehicle to perform the collision avoidance flight can be easily determined. Therefore, it is possible to reduce a processing load of the flight control device 40 for collision avoidance, and to shorten the time required to calculate the collision avoidance route.

According to the present embodiment, the avoidance priority in the case where an occupant is present in the flight vehicle is set to be lower than the avoidance priority in the case where an occupant is absent in the flight vehicle. With this configuration, it is possible to minimize the possibility of causing the flight vehicle, in which an occupant is present, to perform the collision avoidance flight. Therefore, it is less likely that the safety of the occupant is impaired due to the collision avoidance. For example, when a flight vehicle carrying a person as an occupant performs a sudden trajectory change for collision avoidance, a burden on the occupant such as a passenger is large, and a risk of causing an injury or an uncomfortable feeling to the occupant is likely to occur. Therefore, in the present embodiment, by setting the avoidance priority of the flight vehicle carrying no person to be higher, it is possible to restrict as much as possible a situation in which the flight vehicle carrying a person is caused to perform the avoidance operation.

It is considered that the time, energy, and the like required for the flight vehicle to perform the course change such as trajectory change tend to increase as the flight vehicle is heavier. In contrast, according to the present embodiment, the avoidance priority is set to be lower as the flight vehicle is heavier. With this configuration, the possibility that a heavier flight vehicle performs the collision avoidance flight is reduced. Therefore, it is possible to restrict an increase in the required time and energy consumption due to a heavier flight vehicle performing the collision avoidance flight. Accordingly, the efficiency of the collision avoidance flight to be performed by the flight vehicle can be improved.

According to the present embodiment, the fixed priority is set according to the aircraft weight of the subject aircraft 10. With this configuration, since the aircraft weight of the subject aircraft 10 is reflected in the fixed priority, the setting accuracy of the fixed priority can be improved. Further, since it is not necessary for the flight control device 40 to use the weight information of the subject aircraft 10 every time the flight control device 40 corrects the avoidance priority, it is possible to reduce the processing load when acquiring the avoidance priority.

According to the present embodiment, the flight control device 40 acquires the avoidance priority by correcting the fixed priority according to the additional weight of the subject aircraft 10. With this configuration, since the additional weight of the subject aircraft 10 is reflected in the avoidance priority, the setting accuracy of the avoidance priority can be improved.

According to the present embodiment, the avoidance priority in the case where the flight vehicle is an airframe capable of vertical take-off and landing is set to be higher than the avoidance priority in the case where the flight vehicle is an airframe incapable of vertical take-off and landing. With this configuration, it is possible to increase the possibility that the flight vehicle capable of vertical take-off and landing performs the collision avoidance flight. The flight vehicle capable of vertical take-off and landing can change the course more easily than the flight vehicle incapable of vertical take-off and landing, and thus the flight vehicle can easily perform collision avoidance. Further, the adjustment allowance, which is the amount of change when the flight vehicle changes the course, tends to be larger in the flight vehicle capable of vertical take-off and landing than in the flight vehicle incapable of vertical take-off and landing. Therefore, it is easy to cause the flight vehicle capable of vertical take-off and landing to perform the collision avoidance flight in implementing collision avoidance.

According to the present embodiment, the avoidance priority in the case where the flight vehicle is a vertical take-off and landing aircraft and a tiltrotor aircraft is set to be lower than the avoidance priority in the case where the flight vehicle is a vertical take-off and landing aircraft and not the tiltrotor aircraft. That is, the avoidance priority in the case where one rotor serves as both the lift rotor and the cruise rotor in the flight vehicle is set to be lower than the avoidance priority in the case where the lift rotor and the cruise rotor are separately provided in the flight vehicle. With this configuration, it is possible to reduce the possibility that the tiltrotor aircraft performs the collision avoidance flight. When the tiltrotor aircraft changes a tilt angle in order to perform the collision avoidance flight, it is difficult to change the course since it takes time to change the tilt angle. Therefore, in the tiltrotor aircraft as the flight vehicle, it is possible to restrict a delay in the course change for collision avoidance.

According to the present embodiment, the fixed priority is set according to the propulsion mechanism of the subject aircraft 10. With this configuration, since the information on the propulsion mechanism of the subject aircraft 10 is reflected in the fixed priority, the setting accuracy of the fixed priority can be improved. Further, since it is not necessary for the flight control device 40 to use the information on the propulsion mechanism of the subject aircraft 10 every time the flight control device 40 corrects the avoidance priority, it is possible to reduce the processing load when acquiring the avoidance priority.

It is considered that the energy required for the flight vehicle to perform the course change tends to increase as the flight speed of the flight vehicle is larger. In contrast, according to the present embodiment, the avoidance priority is set to be lower as the flight speed of the flight vehicle is larger. With this configuration, the possibility that the flight vehicle having a larger flight speed performs the collision avoidance flight is reduced. Therefore, it is possible to restrict an increase in energy consumption due to a flight vehicle having a larger flight speed performing the collision avoidance flight.

As the flight speed of the flight vehicle increases, the centrifugal force in the case where the flight vehicle flies in a curve for collision avoidance tends to increase. In this case, a physical load tends to be large for a person on board the flight vehicle. In addition, in this case, the risk of breakage tends to increase for the cargo loaded on the flight vehicle. Therefore, the possibility that the flight vehicle having a smaller flight speed performs the collision avoidance flight is increased, and collision avoidance can be easily performed by causing the flight vehicle having a smaller flight speed to perform trajectory change.

According to the present embodiment, the flight control device 40 acquires the avoidance priority by correcting the fixed priority according to the flight speed of the subject aircraft 10. With this configuration, since the flight speed of the subject aircraft 10 is reflected in the avoidance priority, the setting accuracy of the avoidance priority can be improved.

When an abnormality has occurred in the flight vehicle, the course change may be difficult for the flight vehicle. In contrast, according to the present embodiment, the avoidance priority in the case where an abnormality has occurred in the flight vehicle is set to be lower than the avoidance priority in the case where no abnormality has occurred in the flight vehicle. With this configuration, the possibility that the flight vehicle performs the collision avoidance flight in a state where an abnormality has occurred is reduced. Therefore, it is possible to avoid a situation in which the flight vehicle in a state in which an abnormality has occurred cannot perform the collision avoidance flight appropriately. That is, the flight vehicle in which no abnormality has occurred appropriately performs the course change, so that collision avoidance can be easily performed.

According to the present embodiment, the flight control device 40 acquires the avoidance priority by correcting the fixed priority according to the presence or absence of an abnormality in the subject aircraft 10. With this configuration, since the presence or absence of an abnormality in the subject aircraft 10 is reflected in the avoidance priority, the setting accuracy of the avoidance priority can be improved.

According to the present embodiment, the priority relationship is set according to the avoidance priority of the subject aircraft 10 and the avoidance priority of the counterpart aircraft 90. With this configuration, by acquiring the avoidance priority of the subject aircraft 10 and the avoidance priority of the counterpart aircraft 90, it is possible to facilitate setting of the priority relationship for collision avoidance. For example, it is possible to reduce the processing load of the flight control device 40 in calculating the priority relationship, compared to a configuration different from the configuration of the present embodiment in which the priority relationship is directly calculated using the subject aircraft information and the counterpart aircraft information. Accordingly, with respect to the collision avoidance route set by the flight control device 40, it is possible to improve the setting accuracy and to shorten the time required for the setting.

According to the present embodiment, the flight control device 40 acquires the avoidance priority by correcting, using the variable information, the fixed priority set according to the fixed information. With this configuration, it is unnecessary for the flight control device 40 to calculate the fixed priority each time. For example, since the information indicating the fixed priority is stored in the storage device 35, the flight control device 40 only needs to read the fixed priority from the storage device 35. Since the flight control device 40 can acquire the avoidance priority only by correcting the fixed priority, the processing load for acquiring the avoidance priority can be reduced. Since the variable information is reflected in the avoidance priority, the flight control device 40 can acquire the avoidance priority reflecting the current state of the subject aircraft 10. Therefore, the acquisition accuracy of the variable information can be improved.

According to the present embodiment, the flight control device 40 receives the counterpart aircraft information from the reception device 33. With this configuration, since the avoidance priority of the counterpart aircraft 90 can be acquired using the counterpart aircraft information, the acquisition accuracy of the counterpart aircraft information can be improved. Therefore, the priority relationship between the subject aircraft 10 and the counterpart aircraft 90 for collision avoidance can be set with high accuracy.

According to the present embodiment, the flight control device 40 causes the transmission device 34 to transmit the subject aircraft information to the counterpart aircraft 90. With this configuration, since the counterpart aircraft 90 can acquire the subject aircraft information including the avoidance priority of the subject aircraft 10, the subject aircraft information can be shared with the counterpart aircraft 90. Therefore, by sharing the priority relationship between the subject aircraft 10 and the counterpart aircraft 90 for collision avoidance, the subject aircraft 10 and the counterpart aircraft 90 can cooperate to avoid a collision.

Second Embodiment

In the first embodiment, as a method of avoiding a collision, the method of changing the flight route of only the subject aircraft 10 or the counterpart aircraft 90 having a higher order of priority is adopted. In contrast, in a second embodiment, a method of changing the flight route of at least one having a higher order of priority of the subject aircraft 10 and the counterpart aircraft 90 is adopted as the method of avoiding a collision. The method is a method in which both the subject aircraft 10 and the counterpart aircraft 90 may change the flight route. Configurations, operations, and effects not particularly described in the second embodiment are the same as those in the first embodiment. In the second embodiment, differences from the first embodiment will be mainly described.

Figure 7:
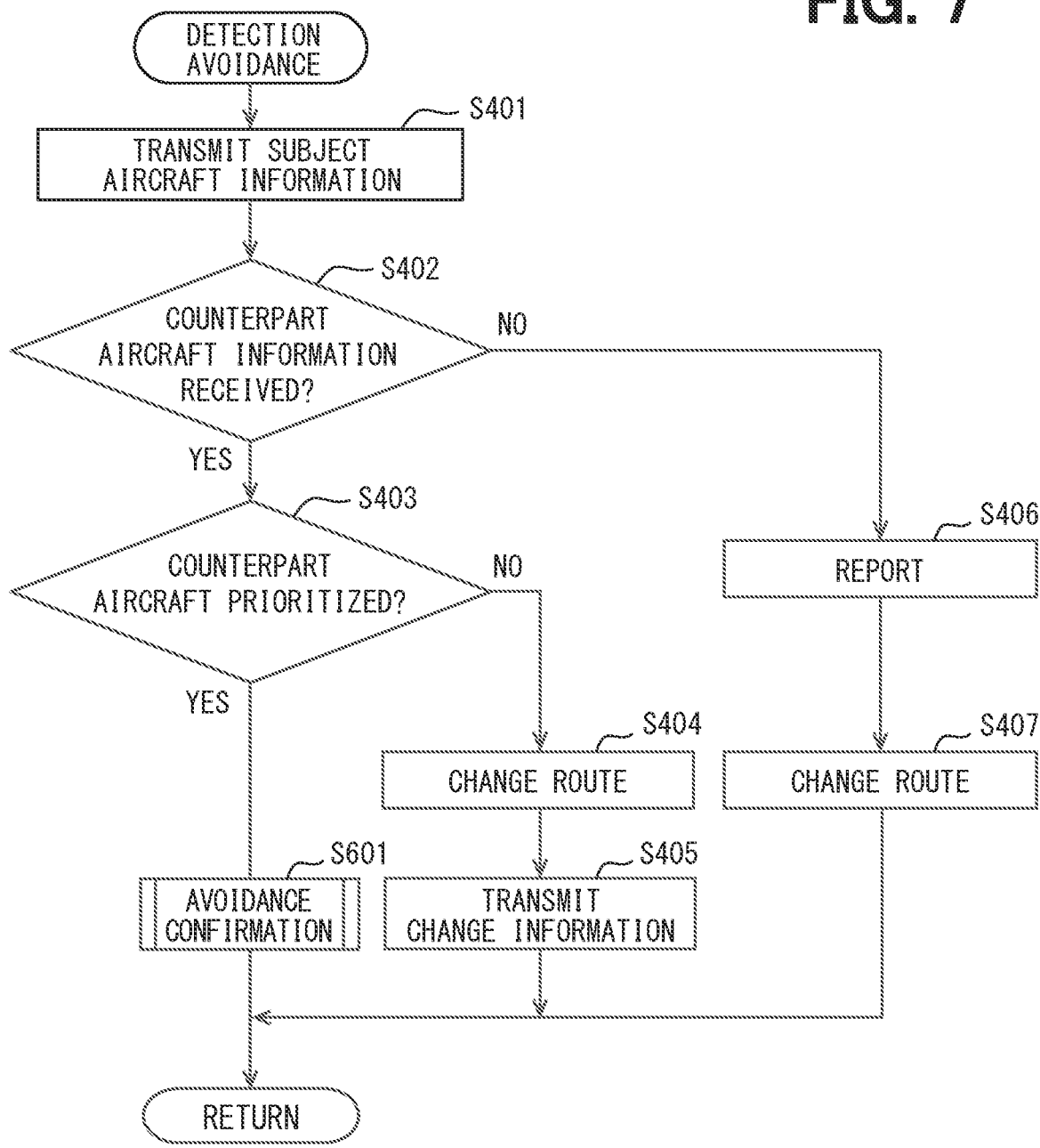
FIG. 7 is a flowchart illustrating a procedure of detection avoidance processing according to a second embodiment.
Figure 8:
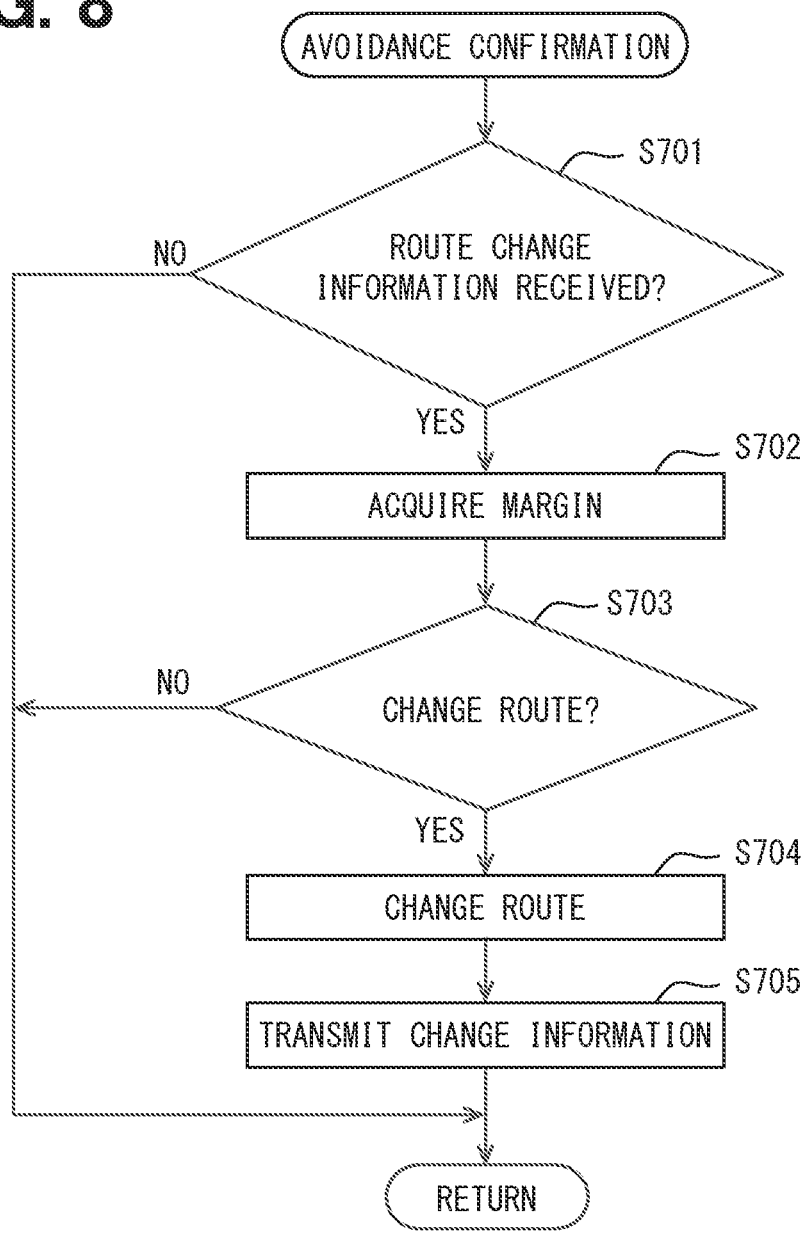
FIG. 8 is a flowchart illustrating a procedure of avoidance confirmation processing.

Detection avoidance processing of the present embodiment will be described with reference to the flowchart of FIG. 7. In steps S401 to S407 shown in FIG. 7, the flight control device 40 performs the same processing as in the first embodiment. However, in step S403, when the order of priority of the counterpart aircraft 90 is higher than the order of priority of the subject aircraft 10 in collision avoidance, the flight control device 40 proceeds to step S601. The flight control device 40 performs avoidance confirmation processing in step S601. The avoidance confirmation processing is processing for confirming whether the subject aircraft 10 performs the collision avoidance flight when the order of priority of the counterpart aircraft 90 is higher than the order of priority of the subject aircraft 10. The avoidance confirmation processing will be described with reference to the flowchart of FIG. 8.

In step S701 of the avoidance confirmation processing, the flight control device 40 determines whether route change information is received from the counterpart aircraft 90. The route change information is information indicating that the counterpart aircraft 90 changes the current flight route to a collision avoidance route. In this case, the subject aircraft 10 and the counterpart aircraft 90 share that the order of priority of the counterpart aircraft 90 is higher than the order of priority of the subject aircraft 10 in collision avoidance. The route change information may be included in the counterpart aircraft information. The determination of whether the route change information is received may be performed together with the determination of whether the counterpart aircraft information is received in step S402 of the detection avoidance processing.

When the route change information is received, the flight control device 40 proceeds to step S702 and performs margin acquisition processing. In the margin acquisition processing, the flight control device 40 calculates a margin allowance for the collision avoidance flight to be performed by the counterpart aircraft 90. The margin allowance is, for example, a separation distance when the counterpart aircraft 90 and the subject aircraft 10 are closest to each other in a case where the counterpart aircraft 90 performs the collision avoidance flight. The margin allowance is also a separation distance between the collision avoidance route of the counterpart aircraft 90 and the flight route of the subject aircraft 10 at a timing when the collision avoidance route and the flight route are closest to each other. The flight control device 40 calculates the margin allowance according to the collision avoidance route of the counterpart aircraft 90 and the flight route of the subject aircraft 10.

In step S703, the flight control device 40 determines whether to change the flight route of the subject aircraft 10. In order to avoid a collision between the subject aircraft 10 and the counterpart aircraft 90, the flight control device 40 determines whether a change of the flight route of the subject aircraft 10 is necessary in addition to the route change of the counterpart aircraft 90. For example, the flight control device 40 determines whether the margin allowance is larger than a predetermined determination value. When the margin allowance is not larger than the determination value, the flight control device 40 determines that it is necessary to change the flight route of the subject aircraft 10. Examples of the case where the margin allowance is not larger than the determination value includes a case where it is predicted that the collision can be avoided by the route change of the counterpart aircraft 90 and a case where it is predicted that the collision cannot be avoided even by the route change of the counterpart aircraft 90.

When changing the flight route of the subject aircraft 10, the flight control device 40 proceeds to step S704 and changes the flight route of the subject aircraft 10. The flight control device 40 changes the flight route of the subject aircraft 10 according to the collision avoidance route of the counterpart aircraft 90 such that the margin allowance increases. The flight route of the subject aircraft 10 is changed to a collision avoidance route of the subject aircraft 10. The collision avoidance route is a route with which the margin allowance can be increased. When it is predicted that the collision cannot be avoided even by the route change of the counterpart aircraft 90, the collision avoidance route of the subject aircraft 10 is a route for enabling avoidance of the collision.

In step S705, flight control device 40 transmits change information to the counterpart aircraft 90. The change information includes information indicating that the flight route of the subject aircraft 10 is changed to the collision avoidance route thereof. The change information may include information indicating the margin allowance.

Returning to FIG. 7, in step S403, when the order of priority of the counterpart aircraft 90 is not higher than the order of priority of the subject aircraft 10, the flight control device 40 performs the processing of steps S404 and S405 as in the first embodiment. In steps S404 and S405, the flight control device 40 changes the route of the counterpart aircraft 90 and transmits change information to the counterpart aircraft 90. In this case, the counterpart aircraft 90 flies along a flight route according to the route change of the subject aircraft 10. It is conceivable that the counterpart aircraft 90 performs the route change according to the route change of the subject aircraft 10. For example, it is conceivable that the counterpart aircraft 90 performs the route change for increasing the margin allowance, for example, by executing the same processing as the avoidance confirmation processing of step S601 in the counterpart aircraft 90.

The detection avoidance processing and the avoidance confirmation processing will be collectively described. It may be expected that, when the order of priority of the counterpart aircraft 90 is higher than that of the subject aircraft 10 in collision avoidance, a sufficient separation distance cannot be secured between the subject aircraft 10 and the counterpart aircraft 90 according to the route information received from the counterpart aircraft 90. In this case, in addition to the flight route of the counterpart aircraft 90, the flight route of the subject aircraft 10 is changed as much as necessary, so that the safety in collision avoidance can be enhanced. Since the order of priority is set for the subject aircraft 10 and the counterpart aircraft 90 in collision avoidance, when it is necessary to change the route of both the subject aircraft 10 and the counterpart aircraft 90, the route change of the one having the lower order of priority in the subject aircraft 10 and the counterpart aircraft 90 may be the minimum necessary route change. In addition, since the order of priority is set for the subject aircraft 10 and the counterpart aircraft 90, it is possible to prevent a situation in which the risk of collision is increased on the contrary due to both the subject aircraft 10 and the counterpart aircraft 90 changing the route. Examples of the case where the risk of collision is increased include a case where the route change of one of the subject aircraft 10 and the counterpart aircraft 90 is performed simultaneously and independently with respect to the route change of the other.

When the subject aircraft 10 has a higher order of priority than the counterpart aircraft 90 in collision avoidance, the subject aircraft 10 should change the course to the best based on the collision avoidance route. Therefore, when the information indicating the collision avoidance route is transmitted from the subject aircraft 10 to the counterpart aircraft 90, it is preferable that the subsequent determination is left to the counterpart aircraft 90.

Third Embodiment

In the second embodiment, in the detection avoidance processing, the method of changing the flight route of at least one having a higher order of priority of the subject aircraft 10 and the counterpart aircraft 90 is adopted. In contrast, in a third embodiment, in reception avoidance processing, the method of changing the flight route of at least one having a higher order of priority of the subject aircraft 10 and the counterpart aircraft 90 is adopted. Configurations, operations, and effects not particularly described in the third embodiment are the same as those in the first embodiment. In the third embodiment, differences from the second embodiment will be mainly described.

Figure 9:
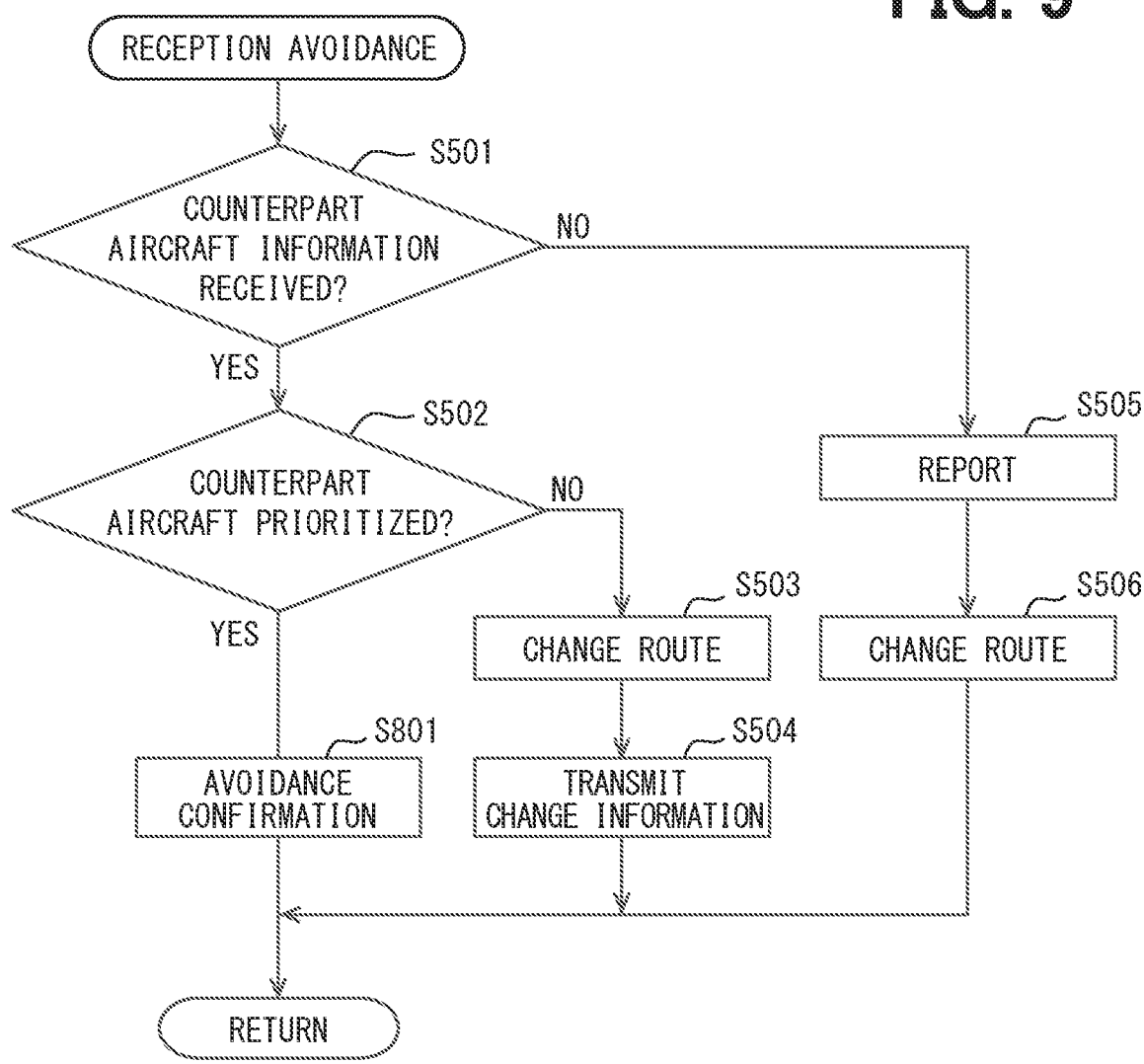
FIG. 9 is a flowchart illustrating a procedure of reception avoidance processing according to a third embodiment.

The reception avoidance processing of the present embodiment will be described with reference to the flowchart of FIG. 9. In steps S501 to S504 shown in FIG. 9, the flight control device 40 performs the same processing as in the first embodiment. However, in step S502, when the order of priority of the counterpart aircraft 90 is higher than the order of priority of the subject aircraft 10 in collision avoidance, the flight control device 40 proceeds to step S801. In step S801, the flight control device 40 performs avoidance confirmation processing as in step S601 of the second embodiment. Accordingly, the same effects as those of the detection avoidance processing of the second embodiment can be obtained in the reception avoidance processing.

Fourth Embodiment

In a fourth embodiment, the subject aircraft 10 is an eVTOL. Configurations, operations, and effects not particularly described in the fourth embodiment are the same as those in the first embodiment described above. In the fourth embodiment, differences from the first embodiment will be mainly described.

Figure 10:
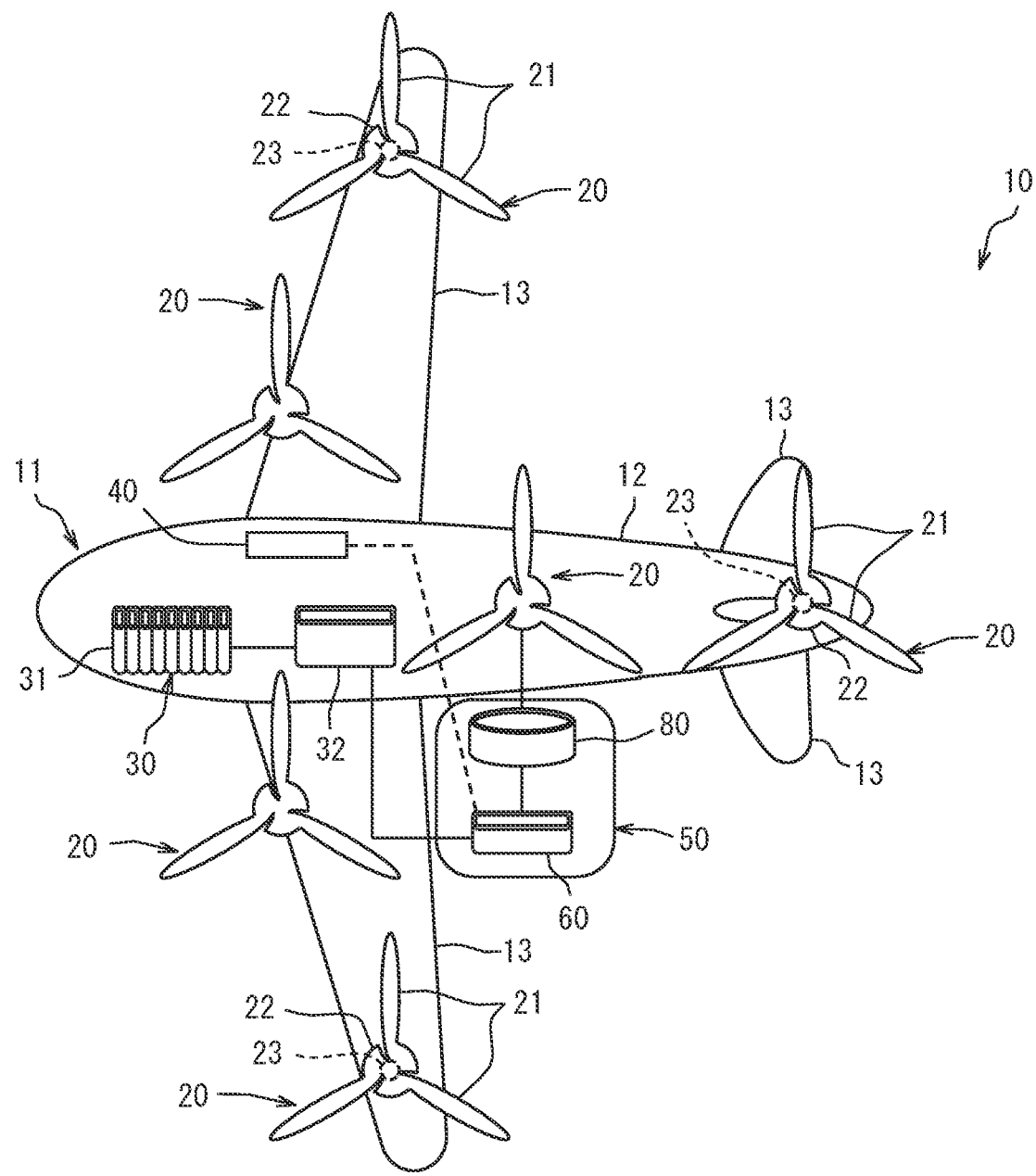
FIG. 10 is a diagram illustrating a configuration of an eVTOL according to a fourth embodiment.

The subject aircraft 10 illustrated in FIG. 10 includes an airframe 11 and a rotor 20. The airframe 11 includes an airframe body 12 and a wing 13. The airframe body 12 is a body of the airframe 11 and has, for example, a shape extending in a front-rear direction. The airframe body 12 has an occupant compartment for carrying an occupant. Multiple wings 13 extend from the airframe body 12 and are provided on the airframe body 12. The wings 13 are fixed wings. The multiple wings 13 include main wings, tail wings, and the like.

Multiple rotors 20 are provided on the airframe 11. The subject aircraft 10 is provided with at least four rotors 20. The rotors 20 are provided on the airframe body 12 and the wings 13. The rotor 20 rotates about a rotor axis. The rotor axis is a rotation axis of the rotor 20 and coincides with a center line of the rotor 20.

The rotor 20 includes a blade 21, a rotor head 22, and a rotor shaft 23. Multiple blades 21 are arranged in a circumferential direction. The rotor head 22 couples the multiple blades 21. The blades 21 extend in a radial direction from the rotor head 22. The blades 21 are vanes that rotate together with the rotor shaft 23. The rotor shaft 23 is a rotation shaft of the rotor 20 and extends from the rotor head 22 along the rotor axis.

The subject aircraft 10 is a tiltrotor aircraft serving as the eVTOL. In the subject aircraft 10, the rotor 20 can be tilted. That is, a tilt angle of the rotor 20 is adjustable. For example, when the subject aircraft 10 ascends, an orientation of the rotor 20 is set such that the rotor axis extends in an up-down direction. In this case, the rotor 20 functions as a lift rotor for generating lift on the subject aircraft 10. That is, the rotor 20 can function as a rotary blade. The lift rotor also functions as a hovering rotor for causing the subject aircraft 10 to hover. The lift rotor can also cause the subject aircraft 10 to descend. The hovering rotor may be referred to as a hover rotor.

When the subject aircraft 10 advances in a front direction, the orientation of the rotor 20 is set such that the rotor axis extends in a front-rear direction. In this case, the rotor 20 functions as a cruise rotor for generating thrust on the subject aircraft 10. In the present embodiment, a front direction of a pilot is defined as a front direction of the subject aircraft 10. A direction in which the subject aircraft 10 advances in a horizontal direction may be defined as the front direction regardless of the front direction of the pilot. In this case, the subject aircraft 10 normally advances in the front direction even when a traveling direction thereof changes.

Figure 11:
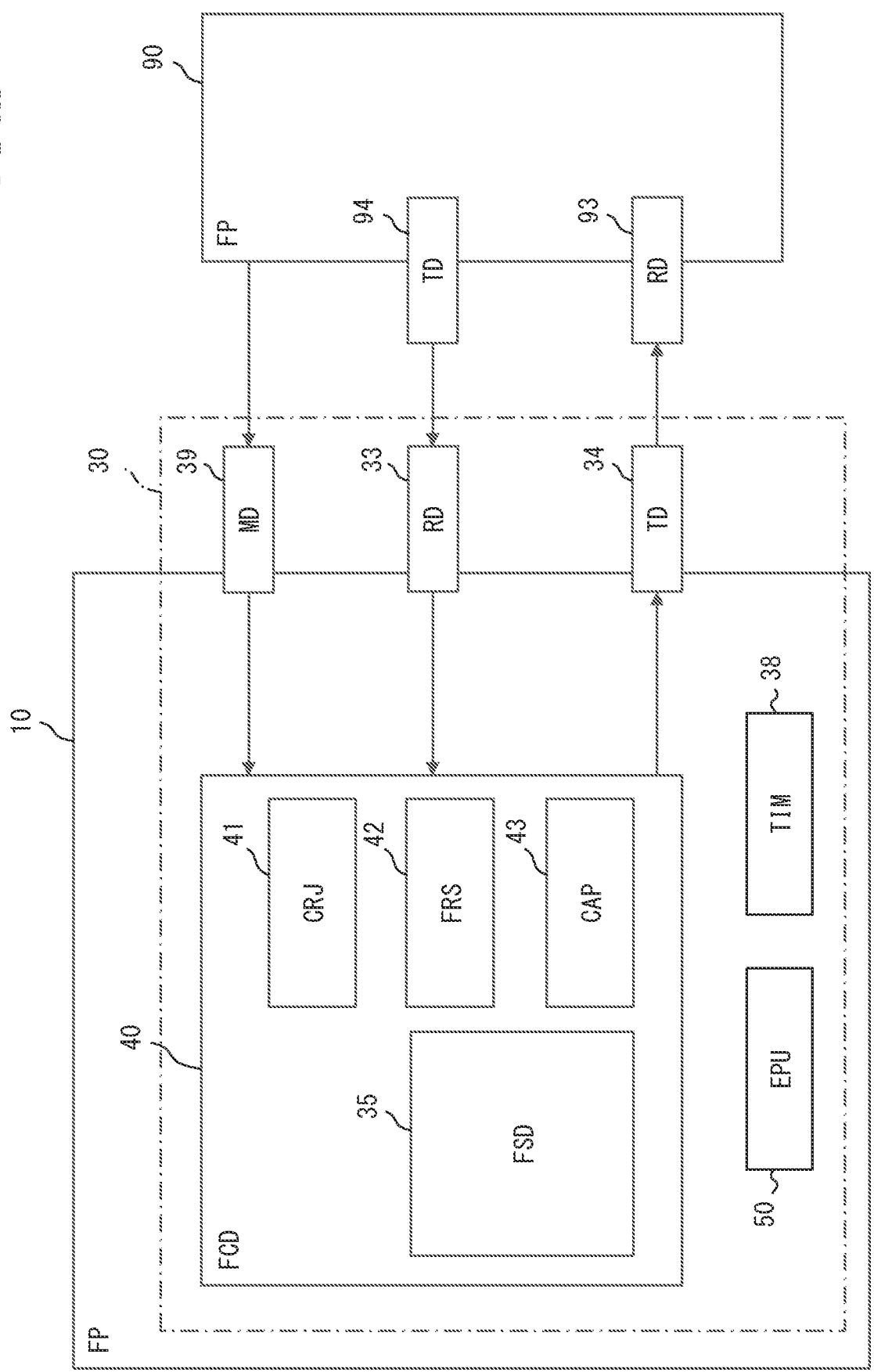
FIG. 11 is a block diagram illustrating an electrical configuration of a subject aircraft and a counterpart aircraft.

As illustrated in FIG. 11, the subject aircraft 10 includes a tilt mechanism 38. The tilt mechanism 38 includes a motor and the like, and is driven to adjust the tilt angle of the rotor 20. The tilt mechanism 38 may be referred to as a tilt drive unit. For example, in the subject aircraft 10, the wings 13 can be tilted relative to the airframe body 12. That is, the rotors 20 can be tilted together with the wings 13. In the subject aircraft 10, the tilt angle of the rotor 20 is adjusted by adjusting an inclination angle of the wing 13 with respect to the airframe body 12. In the subject aircraft 10, the tilt mechanism 38 adjusts the inclination angle of the wing 13.

In the subject aircraft 10, the rotor 20 can be tilted relative to the airframe 11. For example, the tilt angle of the rotor 20 may be adjusted by adjusting a relative inclination angle of the rotor 20 with respect to the wing 13.

As illustrated in FIGS. 10 and 11, the flight system 30 includes the tilt mechanism 38 and an EPU 50. In FIG. 11, the tilt mechanism 38 is denoted by TIM, and the EPU 50 is denoted by EPU.

The EPU 50 is a device that drives the rotor 20 to rotate, and corresponds to a drive device. The EPU is an abbreviation for electric propulsion unit. The EPU 50 may be referred to as an electric drive device. The EPU 50 is individually provided for each of the multiple rotors 20. The EPU 50 is aligned with the rotor 20 along the rotor axis. Each of the multiple EPUs 50 is fixed to the airframe 11. The EPU 50 rotatably supports the rotor 20. The EPU 50 is mechanically connected to the rotor shaft 23. The multiple EPUs 50 include at least one of the EPU 50 fixed to the airframe 11 in a state of protruding outside the airframe 11 and the EPU 50 fixed to the airframe 11 in a state of being embedded inside the airframe 11.

The rotor 20 is fixed to the airframe 11 via the EPU 50. The EPU 50 is designed so as not to tilt relative to the rotor 20. The EPU 50 may be tilted together with the rotor 20. When the tilt angle of the rotor 20 is adjusted, an orientation of the EPU 50 is set together with the rotor 20.

The rotor 20 and the EPU 50 can propel the subject aircraft 10. In the subject aircraft 10, a propulsion device includes the rotor 20 and the EPU 50. Multiple propulsion devices are provided in the subject aircraft 10. When the rotor 20 functions as a lift rotor, the propulsion device can generate vertical thrust. The vertical thrust is a propulsive force in a vertical direction for propelling the subject aircraft 10 in the vertical direction. When the rotor 20 functions as a cruise rotor, the propulsion device can generate horizontal thrust. The horizontal thrust is a propulsive force in the horizontal direction for propelling the subject aircraft 10 in the horizontal direction.

The EPU 50 includes a motor device 80 and an inverter device 60. The motor device 80 includes a motor and a motor housing. The motor is housed in the motor housing. The motor is a multi-phase AC motor, for example, a three-phase AC rotary electric machine. The motor functions as an electric motor that is a flight driving source of the subject aircraft 10. The motor includes a rotor and a stator. The motor is driven by electric power of a battery 31. By driving of the motor, the EPU 50 drives the rotor 20 to rotate. As the motor, for example, a brushless motor is used. As the motor, an induction motor or a reluctance motor may be used.

The inverter device 60 includes an inverter and an inverter housing. The inverter is housed in the inverter housing. The inverter drives the motor by converting electric power to be supplied to the motor. The inverter may be referred to as a drive unit. The inverter converts the electric power to be supplied to the motor from a direct current to an alternating current. The inverter is an electric power conversion unit that converts the electric power. The inverter is a multi-phase electric power conversion unit, and performs electric power conversion for each of the multiple phases. The inverter is, for example, a three-phase inverter. The motor is driven according to a voltage and a current supplied from the inverter.

In the EPU 50, the driving of the motor is controlled according to detection results of various sensors and the like. For example, the EPU 50 includes a drive control unit that controls driving of the motor. The drive control unit is electrically connected to the inverter and the various sensors. The drive control unit performs motor control via the inverter. The drive control unit is electrically connected to the flight control device 40, and performs motor control according to a signal from the flight control device 40. The flight control device 40 may directly control the motor and the like for the EPU 50.

The battery 31 is electrically connected to the multiple EPUs 50. The battery 31 is an electric power supply unit that supplies electric power to the EPU 50, and corresponds to a power supply unit. The battery 31 is a DC voltage source that applies a DC voltage to the EPU 50. The battery 31 includes a rechargeable secondary battery. Examples of the secondary battery include a lithium ion battery and a nickel-hydrogen battery. In addition to or instead of the battery 31, a fuel cell, a generator, or the like may be used as the power supply unit. The battery 31 can store electric power and corresponds to a power storage device.

A distributor 32 is electrically connected to the battery 31 and the multiple EPUs 50. The distributor 32 distributes electric power from the battery 31 to the multiple EPUs 50. The battery 31 is electrically connected to the multiple EPUs 50 via the distributor 32. The battery 31 supplies the electric power to the EPU 50 via the distributor 32. When a voltage of the battery 31 is referred to as a high voltage, the high voltage is applied to the inverter and the motor described later in the EPU 50. The distributor 32 may be omitted as long as the electric power of the battery 31 is supplied to the multiple EPUs 50. As the configuration in which the distributor 32 may be omitted, for example, there is a configuration in which each of the multiple EPUs 50 is individually provided with the power supply unit.

Figure 12:
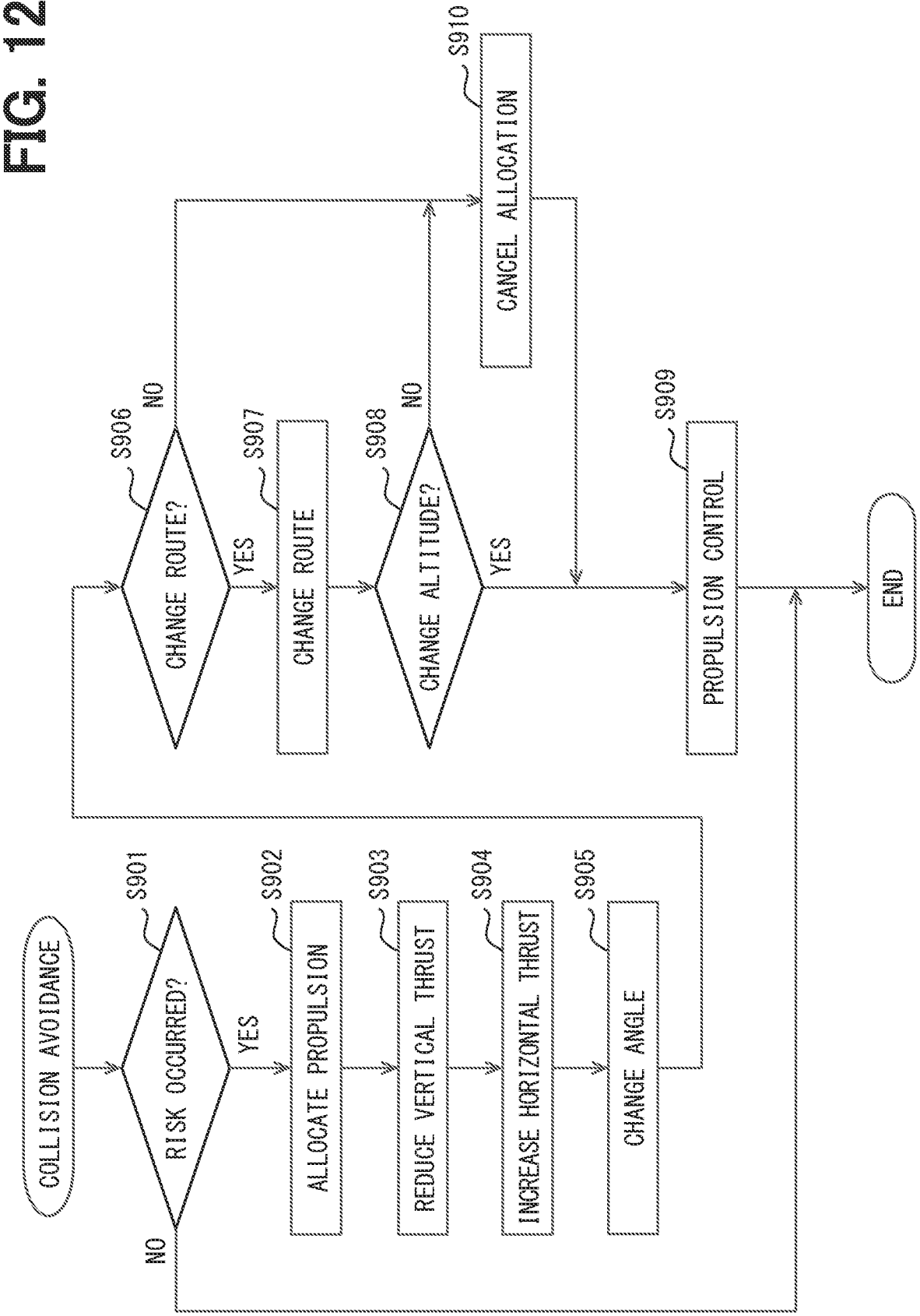
FIG. 12 is a flowchart illustrating a procedure of collision avoidance processing.

The flight control device 40 can perform collision avoidance processing. The collision avoidance processing is processing for the subject aircraft 10 to perform collision avoidance flight along a collision avoidance route. The collision avoidance processing is performed, for example, together with the flight control processing of the first embodiment. The collision avoidance processing will be described with reference to the flowchart shown in FIG. 12.

In step S901 of the collision avoidance processing, the flight control device 40 determines whether a risk of collision has occurred. The flight control device 40 performs at least one of a determination as to whether a risk of collision has been detected and a determination as to whether information indicating a risk of collision has been received. For example, when a risk of collision has been detected in step S105 of the first embodiment or when information indicating a risk of collision has been received in step S107, the flight control device 40 determines that a risk of collision has occurred.

When a risk of collision has occurred, in steps S902 to S905, the flight control device 40 performs change preparation processing that is preparation for changing a flight route. In the change preparation processing, processing of changing a state of the propulsion device while maintaining a flight state of the subject aircraft 10 before occurrence of the risk of collision is performed.

In step S902, the flight control device 40 performs allocation processing for allocating thrust in the subject aircraft 10. The flight control device 40 allocates the multiple propulsion devices to a vertical thrust generation device for generating vertical thrust and a horizontal thrust generation device for generating horizontal thrust. In the allocation processing, the multiple rotors 20 are allocated to the lift rotor and the cruise rotor.

In step S903, the flight control device 40 performs down processing for reducing the vertical thrust. In this processing, the vertical thrust generation device is driven so that the vertical thrust is reduced as compared with that before the occurrence of the risk of collision. In step S904, the flight control device 40 performs up processing for increasing the horizontal thrust. In this processing, the horizontal thrust generation device is driven so that the horizontal thrust is increased as compared to that before the occurrence of the risk of collision.

In step S905, the flight control device 40 performs angle change processing. The flight control device 40 changes a tilt angle of the vertical thrust generation device to an angle at which the vertical thrust can be generated. In the vertical thrust generation device, the tilt angle of the rotor 20 is changed by the tilt mechanism 38. By performing the change preparation processing in steps S902 to S905, the vertical thrust generation device can be secured while maintaining the horizontal thrust of the subject aircraft 10 before the occurrence of the risk of collision.

In step S906, the flight control device 40 determines whether to change the route. Examples of the case of changing the route include cases where it is determined to change the route in steps S404, S407, and S503 of the first embodiment. In addition, there is a case where it is determined to change the route in step S704 of the second embodiment. When changing the route, the flight control device 40 proceeds to step S907 and changes the route. In step S907, the flight control device 40 changes the flight route of the subject aircraft 10 to the collision avoidance route as in steps S404, S407, S503, and S704.

The flight control device 40 determines whether to change an altitude in step S908. The flight control device 40 determines whether it is necessary to cause the subject aircraft 10 to ascend or descend to change the altitude on the collision avoidance route. When changing the altitude, the flight control device 40 proceeds to step S909, and performs propulsion control for the collision avoidance route requiring the change in altitude. The flight control device 40 performs drive control for both the vertical thrust generation device and the horizontal thrust generation device such that the subject aircraft 10 ascends or descends along the collision avoidance route.

When the altitude is not to be changed in step S908, the flight control device 40 proceeds to step S910 and performs cancellation processing of cancelling the allocation of the propulsion devices. This processing is processing of returning the propulsion devices, which are allocated to the vertical thrust generation device and the horizontal thrust generation device, to the state before the occurrence of the risk of collision. The flight control device 40 returns the tilt angle of the propulsion device to the tilt angle before the occurrence of the risk of collision. When the route change is necessary, after the cancellation processing is completed, the flight control device 40 proceeds to step S909 and performs the propulsion control for the collision avoidance route that does not require the change in altitude. The flight control device 40 controls the propulsion device such that the subject aircraft 10 performs the collision avoidance flight along the collision avoidance route.

When the route is not to be changed in step S906, the flight control device 40 proceeds to step S910 and performs the cancellation processing. When the route change is not necessary, after the cancellation processing is completed, the flight control device 40 proceeds to step S909 and performs the propulsion control for the flight route taken before the occurrence of the risk of collision. The flight control device 40 controls the propulsion device such that the subject aircraft 10 flies along the flight route taken before the occurrence of the risk of collision.

The collision avoidance processing of the fourth embodiment will be collectively described. In the eVTOL in which the propulsion device is used for both hovering and cruise, the thrust in the horizontal direction and the thrust in the vertical direction can be adjusted by changing the angle of the propulsion device by the tilt mechanism 38. During cruise, all the propulsion devices often have an angle at which the thrust is generated in the horizontal direction. In this case, when the risk of collision is detected, it is preferable to change the angle such that some of the propulsion devices can generate thrust in the vertical direction. At this time, in order to maintain the cruise state, the propulsion device for generating the thrust in the vertical direction preferably has the angle changed after weakening its thrust so that the airframe of the eVTOL does not change in the vertical direction during the angle change, and the propulsion device for maintaining the cruise preferably increases its thrust. Accordingly, it is possible to maintain the cruise state of the eVTOL.

According to the present embodiment, the subject aircraft 10 is an electric aircraft including the rotor 20 and the EPU 50. Therefore, when the subject aircraft 10 avoids a collision between the subject aircraft 10 and the counterpart aircraft 90 by the collision avoidance flight, it is easy to implement a sudden course change accompanying the avoidance.

Fifth Embodiment

In the fourth embodiment, one rotor 20 in the subject aircraft 10 serves as both the lift rotor and the cruise rotor. In contrast, in a fifth embodiment, a lift rotor and a cruise rotor are separately provided in the subject aircraft 10. Configurations, operations, and effects not particularly described in the fifth embodiment are the same as those in the first embodiment described above. In the fifth embodiment, differences from the fourth embodiment will be mainly described.

Figure 13:
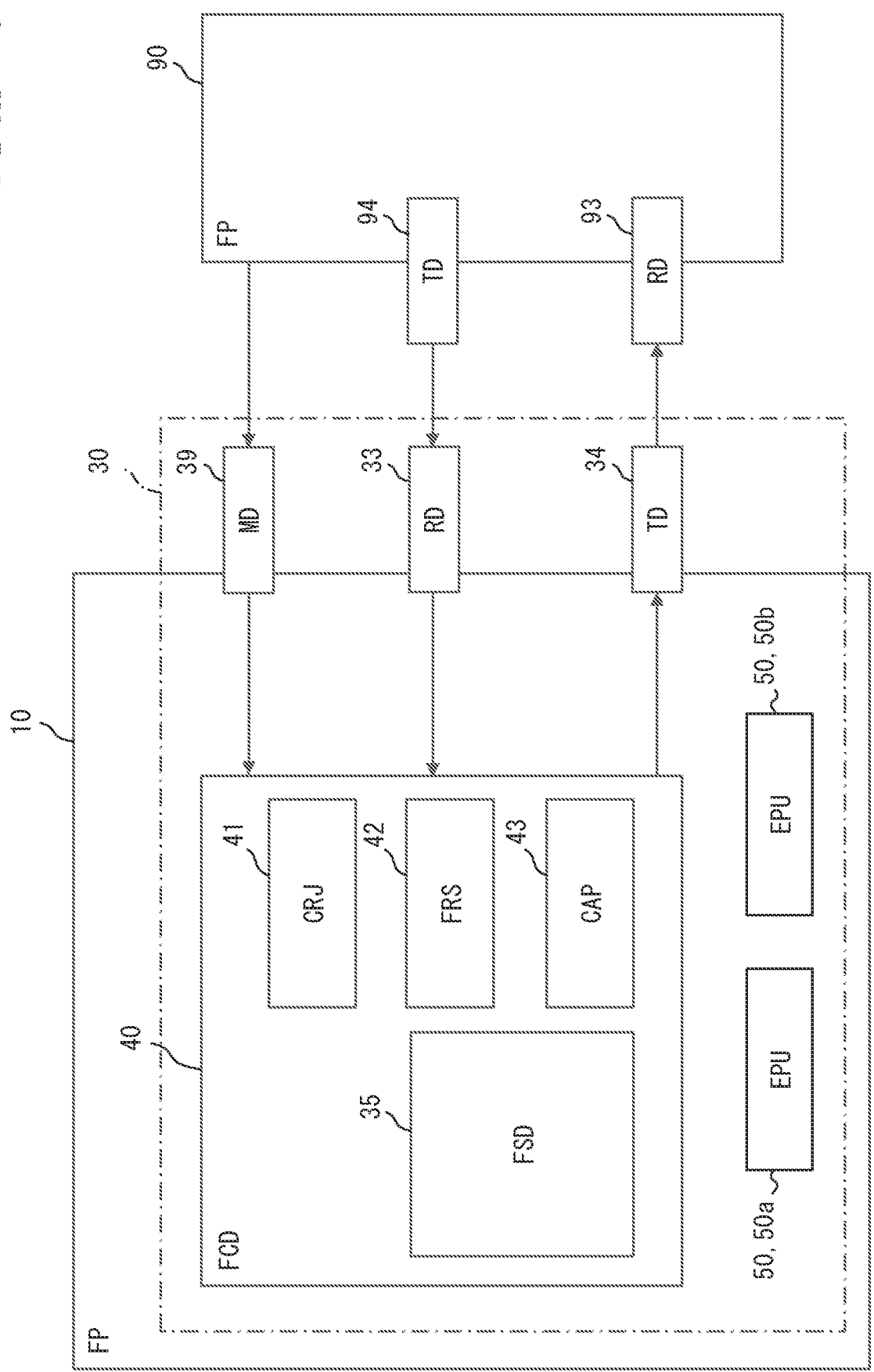
FIG. 13 is a block diagram illustrating an electrical configuration of a subject aircraft and a counterpart aircraft according to a fifth embodiment.

In the subject aircraft 10 illustrated in FIG. 13, multiple lift rotors and multiple cruise rotors are provided. The subject aircraft 10 includes a lift EPU 50*a* and a cruise EPU 50*b* as the EPU 50. The lift EPU 50*a* is a device that drives the lift rotor to rotate. The lift EPU 50*a* may be referred to as a hover drive device. The cruise EPU 50*b* is a device that drives the cruise rotor to rotate. The cruise EPU 50*b* may be referred to as a cruise drive device.

In the subject aircraft 10, a vertical thrust generation device and a horizontal thrust generation device are separately provided as propulsion devices. Multiple vertical thrust generation devices and multiple horizontal thrust generation devices are mounted on the subject aircraft 10. The vertical thrust generation device includes the lift rotor and the lift EPU 50*a*. The vertical thrust generation device may be referred to as a hover propulsion device. The horizontal thrust generation device includes the cruise rotor and the cruise EPU 50*b*. The horizontal thrust generation device may be referred to as a cruise propulsion device.

Figure 14:
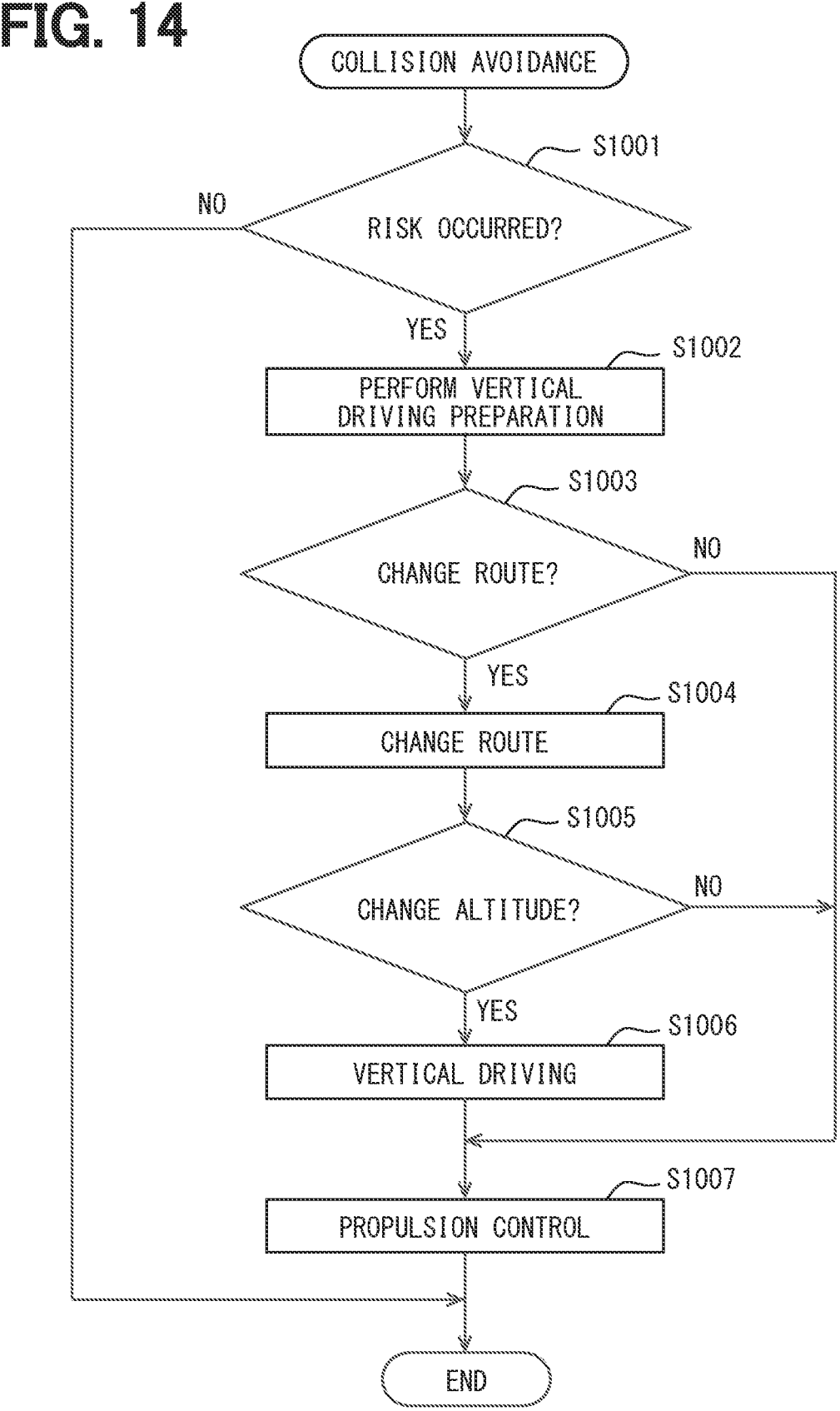
FIG. 14 is a flowchart illustrating a procedure of collision avoidance processing.

The flight control device 40 can perform collision avoidance processing as in the fourth embodiment. The collision avoidance processing of the present embodiment will be described with reference to the flowchart shown in FIG. 14.

In step S1001 of the collision avoidance processing, the flight control device 40 determines whether a risk of collision has occurred. This determination is performed as in step S901 of the fourth embodiment.

When a risk of collision has occurred, the flight control device 40 proceeds to step S1002 and performs vertical driving preparation. The flight control device 40 performs preparation for driving the vertical thrust generation device as the vertical driving preparation. For example, a vertical thrust generation device in which the lift rotor can shift between a normal state and a standby state is assumed. The vertical driving preparation includes processing for shifting the lift rotor from the standby state to the normal state in the vertical thrust generation device.

In the vertical thrust generation device, the lift rotor is in the standby state when the subject aircraft 10 is cruising. Examples of the standby state of the lift rotor include a state in which the lift rotor is housed in a housing space and a state in which the lift rotor is folded. On the other hand, when the subject aircraft 10 is during vertical take-off, during vertical landing, or during cruise, the lift rotor is driven to rotate in the normal state. Examples of the normal state of the lift rotor include a state in which the lift rotor is exposed from the housing space and can be driven to rotate. Further, there is a state in which the lift rotor is unfolded and can be driven to rotate.

In step S1003, the flight control device 40 determines whether to change a route. This determination is performed as in step S906 of the fourth embodiment. When changing the route, the flight control device 40 proceeds to step S1004 and changes the route. The route change is performed as in step S907 of the fourth embodiment. In step S1005, the flight control device 40 determines whether to change an altitude. This determination is performed as in step S908 of the fourth embodiment. When changing the altitude, the flight control device 40 proceeds to step S1006.

When changing the altitude, the flight control device 40 proceeds to step S1006 and drives the vertical thrust generation device. In driving the vertical thrust generation device, the lift EPU 50*a* is driven to drive the lift rotor to rotate. When changing the altitude, the flight control device 40 proceeds to step S1007 after step S1006, and performs propulsion control for a collision avoidance route requiring the change in altitude. The flight control device 40 drives the horizontal thrust generation device in addition to the vertical thrust generation device such that the subject aircraft 10 ascends or descends along the collision avoidance route. The flight control device 40 performs drive control for both the lift EPU 50*a* and the cruise EPU 50*b*.

When the altitude is not to be changed in step S1005, the flight control device 40 proceeds to step S1007 and performs the propulsion control for the collision avoidance route that does not require the change in altitude. In this case, the flight control device 40 does not drive the vertical thrust generation device, and drives the horizontal thrust generation device such that the subject aircraft 10 performs collision avoidance flight along the collision avoidance route.

When the route is not to be changed in step S1003, the flight control device 40 proceeds to step S1007 and performs the propulsion control for the flight route taken before the occurrence of the risk of collision. In this case, the flight control device 40 does not drive the vertical thrust generation device, and drives the horizontal thrust generation device such that the subject aircraft 10 flies along the flight route taken before the occurrence of the risk of collision.

The collision avoidance processing of the fifth embodiment will be collectively described. In the eVTOL in which different propulsion devices are driven in hovering and cruise, the hover propulsion device is often not driven during cruise flight. The hover drive device includes a hover motor, a hover propeller, and the like. A case is assumed in which it is better to change a course not only in horizontal direction but also in altitude in order to avoid a collision. In contrast, depending on the type of the eVTOL, in order to prevent the hover propeller from becoming resistance during cruise, for example, the hover propeller may be stored in a storage container or the hover propeller may be fixed at a predetermined position so as not to rotate. In this configuration, if control is started so that the hover propeller can be operated after a course change for collision avoidance is required, there is a concern that a delay occurs in the collision avoidance operation. Therefore, it is preferable that the hover propeller or the like can be driven when a risk of collision is detected, and when the course change in the vertical direction is actually required, the hover propeller or the like can be promptly started to be driven to change the course.

Sixth Embodiment

In the first embodiment, the subject aircraft 10 and the counterpart aircraft 90 can directly communicate with each other. In contrast, in a sixth embodiment, the subject aircraft 10 and the counterpart aircraft 90 can indirectly communicate with each other via a management center. Configurations, operations, and effects not particularly described in the sixth embodiment are the same as those in the first embodiment described above. In the sixth embodiment, differences from the first embodiment will be mainly described.

Figure 15:
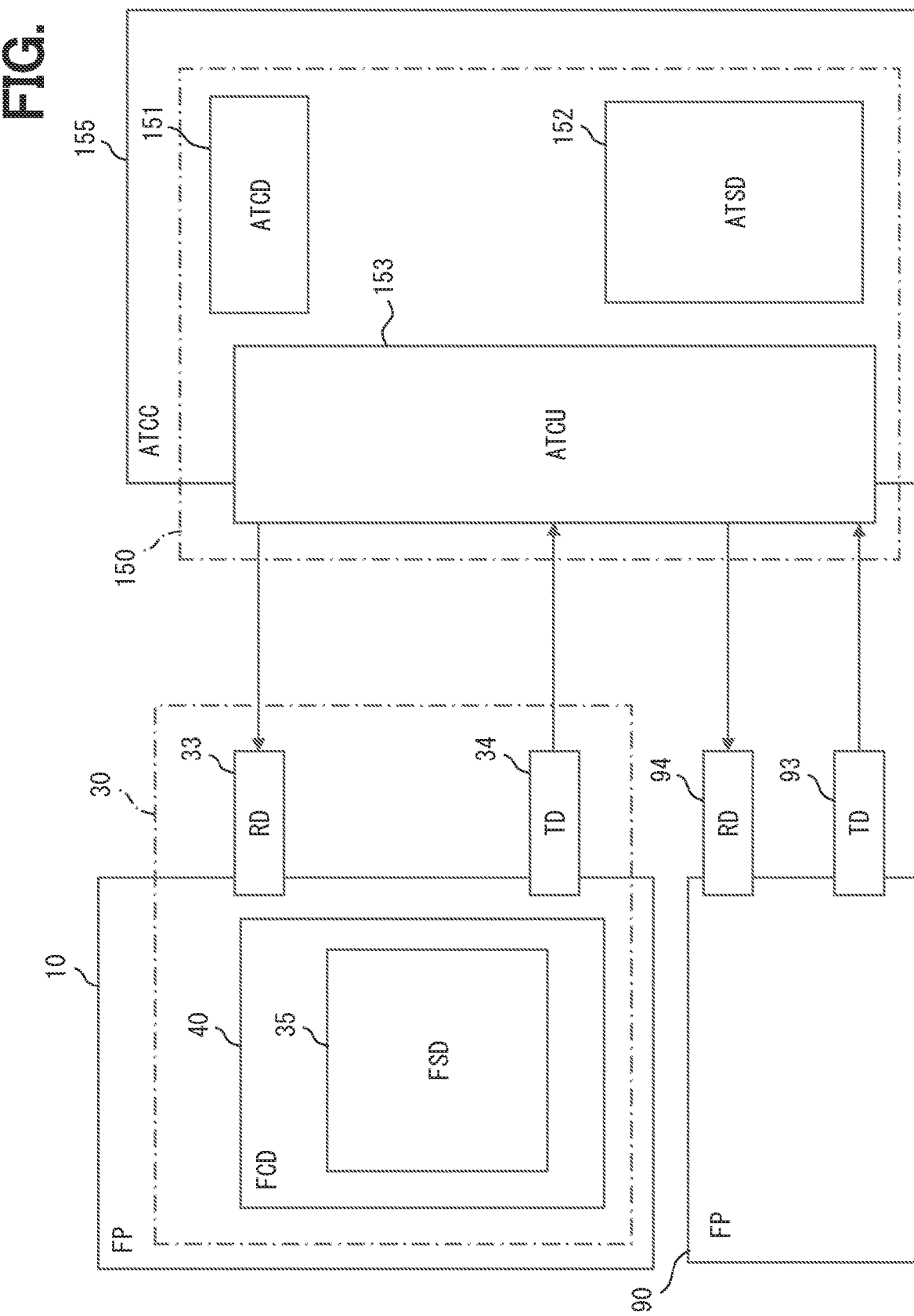
FIG. 15 is a block diagram illustrating an electrical configuration of a subject aircraft, a counterpart aircraft, and a management center according to a sixth embodiment.

In FIG. 15, each of the subject aircraft 10 and the counterpart aircraft 90 can communicate with the control center 155. The control center 155 is a type of management center, and is a facility for controlling the flight of flight vehicles such as the subject aircraft 10 and the counterpart aircraft 90. The control includes managing the flight of the flight vehicle and restricting the flight of the flight vehicle. The control center 155 corresponds to a management facility.

In the control center 155, a control system 150 is constructed. The control system 150 can control the subject aircraft 10 and the counterpart aircraft 90. The control system 150 can control flight vehicles such as the subject aircraft 10 and the counterpart aircraft 90. The control system 150 includes a control device 151, a storage device 152, and a communication device 153. Similarly to the flight control device 40, the control device 151 is mainly implemented by a micro computer. The control device 151 is a control device that controls the control system 150. The control device 151 is electrically connected to the storage device 152 and the communication device 153. In FIG. 15, the control device 151 is denoted by ATCD, the storage device 152 by ATSD, the communication device 153 by ATCU, and the control center 155 by ATCC.

The storage device 152 stores control information for controlling the flight vehicle. The control information includes subject aircraft information and counterpart aircraft information. The subject aircraft information stored in the storage device 152 includes fixed information of the subject aircraft 10 and information indicating an avoidance priority such as a fixed priority of the subject aircraft 10. The counterpart aircraft information stored in the storage device 152 includes fixed information of the counterpart aircraft 90 and information indicating an avoidance priority such as a fixed priority of the counterpart aircraft 90.

The control system 150 can communicate with the subject aircraft 10 and the counterpart aircraft 90. The communication device 153 can wirelessly communicate with each of the reception device 33 and the transmission device 34 provided in the subject aircraft 10. The communication device 153 can wirelessly communicate with each of the reception device 93 and the transmission device 94 provided in the counterpart aircraft 90. The communication device 153 can output and receive information to and from the control device 151. The reception device 33, 93, the transmission device 34, 94, and the communication device 153 enable transmission and reception of information between the control center 155 and the subject aircraft 10, and transmission and reception of information between the control center 155 and the counterpart aircraft 90. Information transmitted from the subject aircraft 10 to the control center 155 includes the subject aircraft information. Information transmitted from the counterpart aircraft 90 to the control center 155 includes the counterpart aircraft information.

The control device 151 performs management processing for managing the flight of the flight vehicle. The management processing includes processing for avoiding a collision of the flight vehicle. With this processing, for example, it is possible to avoid a collision between the subject aircraft 10 and the counterpart aircraft 90. In the management processing, the control device 151 can execute processing of predicting a collision and processing of setting the avoidance priority, a priority relationship, and a collision avoidance route, as the processing performed by the flight control device 40 in the first embodiment.

Figure 16:
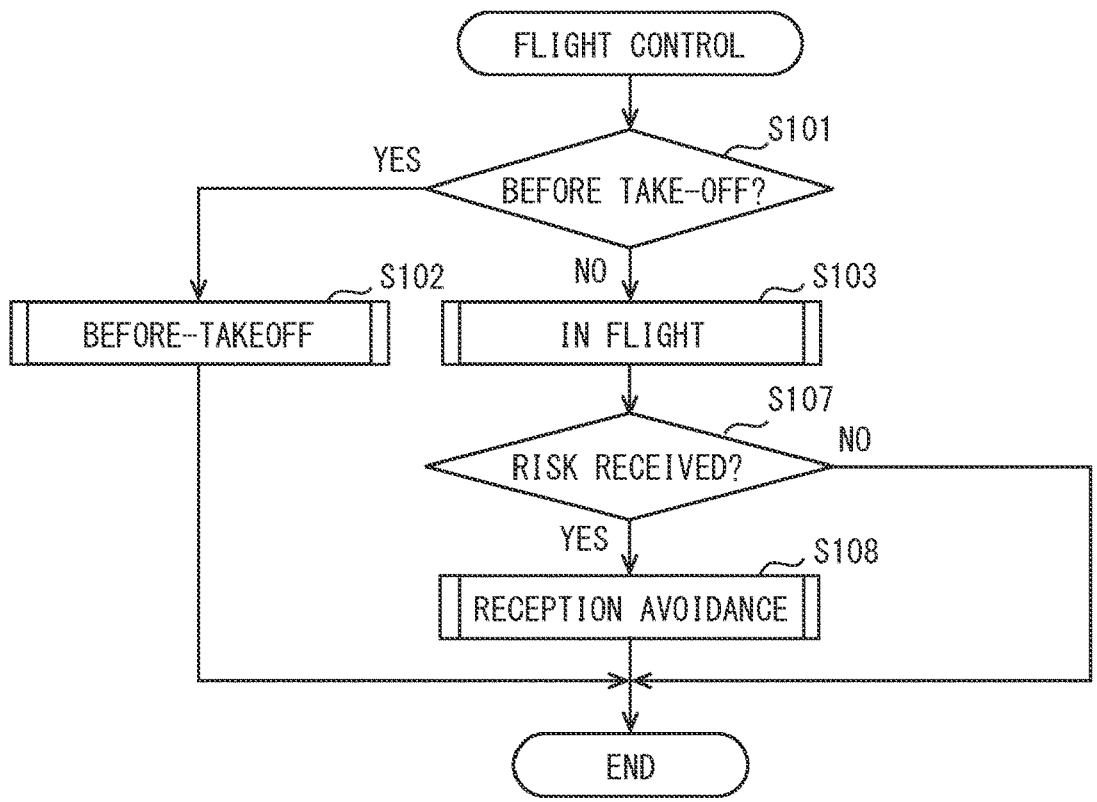
FIG. 16 is a flowchart illustrating a procedure of flight control processing.

The flight control device 40 performs flight control processing as in the first embodiment. The flight control processing of the present embodiment will be described with reference to the flowchart of FIG. 16. In steps S101 to S103 shown in FIG. 16, the flight control device 40 performs the same processing as in the first embodiment. However, processing contents of steps S102 and S103 are different from those of the first embodiment. The before-takeoff processing of step S102 will be described with reference to the flowchart of FIG. 17.

Figure 17:
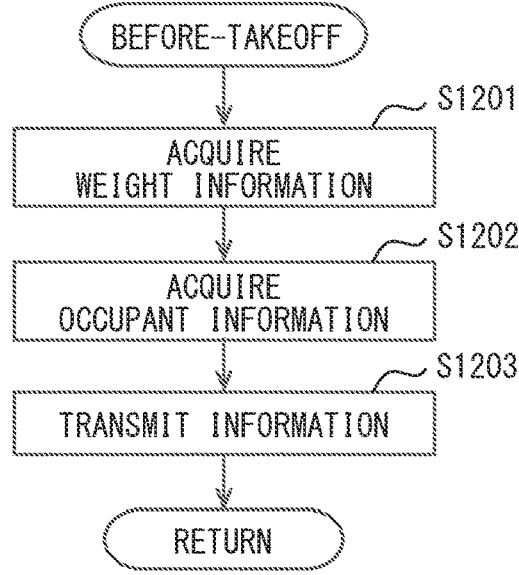
FIG. 17 is a flowchart illustrating a procedure of before-takeoff processing.

In step S1201 shown in FIG. 17, the flight control device 40 performs processing of acquiring weight information of the subject aircraft 10. This processing is performed as in step S201 of the first embodiment. In step S1202, the flight control device 40 performs processing of acquiring occupant information of the subject aircraft 10. This processing is performed as in step S203 of the first embodiment.

In step S1203, the flight control device 40 transmits information. In the information transmission, the subject aircraft information including the weight information and the occupant information is transmitted to the control center 155. The subject aircraft information transmitted in the before-takeoff processing includes identification information of the subject aircraft 10. In the control center 155, the control device 151 stores the subject aircraft information in the storage device 152 in a state where the weight information and the occupant information are associated with the identification information. The function of the flight control device 40 executing the processing of step S1203 corresponds to an information output unit.

Figure 18:
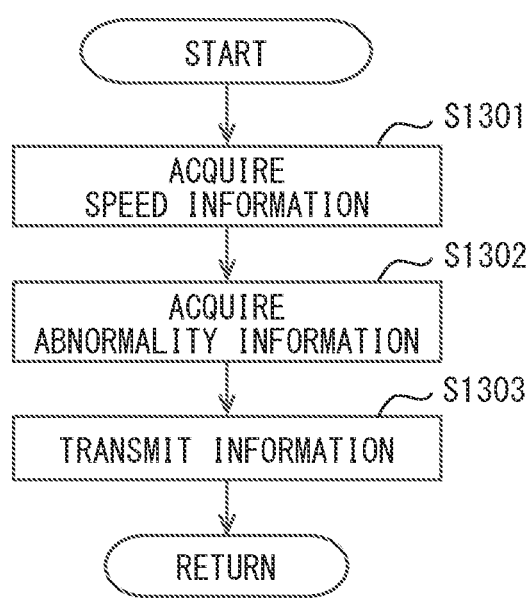
FIG. 18 is a flowchart illustrating a procedure of in-flight processing.

Next, the in-flight processing in step S103 will be described with reference to the flowchart of FIG. 18. In step S1301 shown in FIG. 18, the flight control device 40 performs processing of acquiring speed information of the subject aircraft 10. This processing is performed as in step S301 of the first embodiment. In step S1302, the flight control device 40 performs processing of acquiring abnormality information of the subject aircraft 10. This processing is performed as in step S303 of the first embodiment.

In step S1303, the flight control device 40 transmits information. In the information transmission, the subject aircraft information including the speed information and the abnormality information is transmitted to the control center 155. The subject aircraft information transmitted in the in-flight processing includes the identification information of the subject aircraft 10. In the control center 155, the control device 151 stores the subject aircraft information in the storage device 152 in a state where the speed information and the abnormality information are associated with the identification information. The function of the flight control device 40 executing the processing of step S1303 corresponds to the information output unit.

Returning to FIG. 16, the flight control device 40 proceeds to step S107 after step S103. In the present embodiment, differently from the first embodiment, the processing of steps S104 to S106 is not performed. That is, the flight control device 40 of the present embodiment does not perform the processing of predicting a collision and the processing of setting the avoidance priority, the priority relationship, and the collision avoidance route.

In step S107, as in the first embodiment, the flight control device 40 determines whether information indicating a risk of collision has been received. However, in the present embodiment, the control center 155, not the counterpart aircraft 90, transmits the information indicating a risk of collision to the subject aircraft 10. Therefore, the subject aircraft 10 receives the information indicating a risk of collision as the information transmitted from the control center 155.

When the information indicating a risk of collision is received, the flight control device 40 proceeds to step S108 and performs reception avoidance processing as in the first embodiment. However, processing contents of step S108 are different from those of the first embodiment. The reception avoidance processing of step S108 will be described with reference to the flowchart of FIG. 19.

Figure 19:
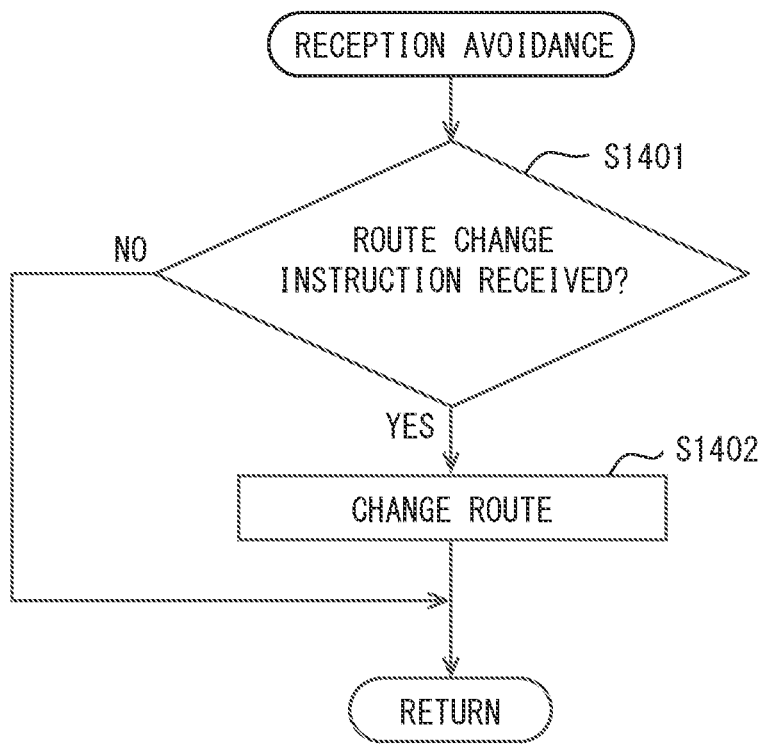
FIG. 19 is a flowchart illustrating a procedure of reception avoidance processing.

In step S1401 shown in FIG. 19, the flight control device 40 determines whether a route change instruction is received from the control center 155. The route change instruction includes changing a flight route of the subject aircraft 10 to the collision avoidance route, information indicating the collision avoidance route, and the like. In addition, the route change instruction includes information indicating the priority relationship between the subject aircraft 10 and the counterpart aircraft 90 in collision avoidance. The function of the flight control device 40 executing the processing of step S1401 corresponds to a priority relationship acquisition unit and a route acquisition unit. The route change instruction may be included in the information indicating a risk of collision.

When the route change instruction is received, the flight control device 40 proceeds to step S1402 and changes the flight route of the subject aircraft 10. The flight control device 40 changes the flight route, which is taken before the occurrence of the risk of collision, to the collision avoidance route for the subject aircraft 10. The flight control device 40 performs collision avoidance control to cause the subject aircraft 10 to fly along the collision avoidance route instructed by the control center 155.

Next, the management processing performed by the control device 151 will be described with reference to the flowchart shown in FIG. 20. The control device 151 repeatedly executes the management processing at a predetermined management cycle. The control device 151 has a function of executing processing of each step in the management processing.

Figure 20:
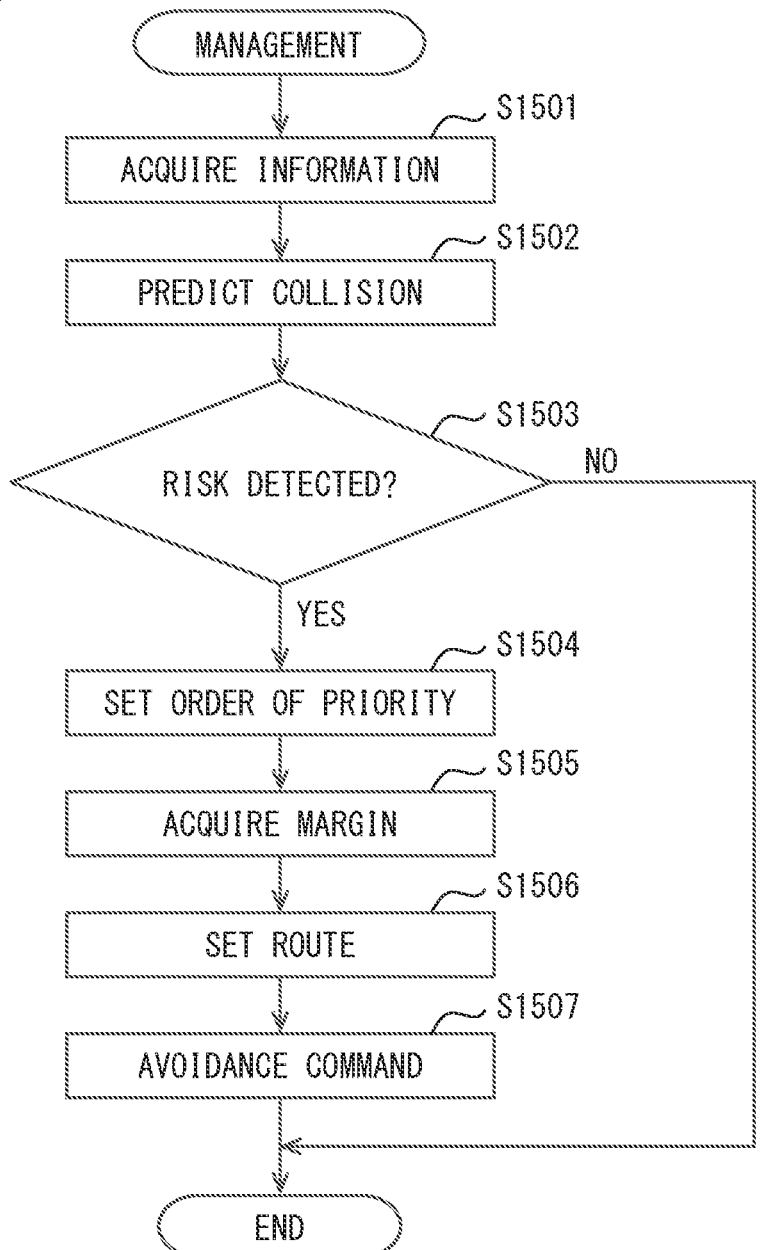
FIG. 20 is a flowchart illustrating a procedure of management processing.

The control device 151 performs information acquisition processing in step S1501 shown in FIG. 20. In this processing, processing of acquiring the subject aircraft information received from the subject aircraft 10 and processing of acquiring the counterpart aircraft information received from the counterpart aircraft 90 are performed. In step S1502, the control device 151 performs collision prediction using the subject aircraft information and the counterpart aircraft information as in step S104 of the first embodiment. In step S1503, the control device 151 determines whether a risk of collision has been detected, as in step S105 of the first embodiment.

When a risk of collision between the subject aircraft 10 and the counterpart aircraft 90 has been detected, the control device 151 proceeds to step S1504. In step S1504, the control device 151 sets orders of priority of the subject aircraft 10 and the counterpart aircraft 90 as in step S403 of the first embodiment. In this setting, the priority relationship between the subject aircraft 10 and the counterpart aircraft 90 is set according to the subject aircraft information and the counterpart aircraft information.

In step S1505, the control device 151 performs margin acquisition processing as in step S702 of the second embodiment. In this processing, the collision avoidance route is set, for the one having a higher order of priority of the subject aircraft 10 and the counterpart aircraft 90, using the subject aircraft information and the counterpart aircraft information. In addition, in this processing, a margin allowance is calculated for the collision avoidance route of the one having a higher order of priority and the flight route of the one having a lower order of priority. The control device 151 acquires the calculated margin allowance.

In step S1506, the control device 151 sets the collision avoidance route for at least one of the subject aircraft 10 and the counterpart aircraft 90. For example, when the margin allowance is larger than a predetermined determination value, the control device 151 sets the collision avoidance route for only the one having a higher order of priority of the subject aircraft 10 and the counterpart aircraft 90. On the other hand, when the margin allowance is not larger than the determination value, the control device 151 also sets the collision avoidance route for the one having a lower order of priority such that the margin allowance is increased.

The control device 151 issues an avoidance command in step S1507. The control device 151 transmits the avoidance command including the collision avoidance route to at least one of the subject aircraft 10 and the counterpart aircraft 90. Accordingly, the control device 151 can cause at least one of the subject aircraft 10 and the counterpart aircraft 90 to perform the collision avoidance flight according to the collision avoidance route. The control device 151 may transmit information indicating that the collision avoidance route is not set, to the subject aircraft 10 or the counterpart aircraft 90 for which the collision avoidance route is not set.

The management processing will be collectively described. In the control center 155, a determination regarding a risk of collision between the subject aircraft 10 and counterpart aircraft 90 is performed. When the risk of collision has occurred, calculation for changing a course is performed in the control center 155 for the airframe having a higher order of priority in collision avoidance. In the control center 155, the margin allowance for collision avoidance is calculated, and it is determined according to the margin allowance whether a course change is necessary for the airframe having a lower order of priority. When the course change is necessary for the airframe having a lower order of priority, calculation for changing a course is performed in the control center 155 for the airframe having a lower order of priority. Examples of the case where the course change is necessary for the airframe having a lower order of priority include a case where there is a concern that the safety cannot be sufficiently secured only by changing the course of the airframe having a higher order of priority.

According to the present embodiment, in avoiding a collision between the subject aircraft 10 and the counterpart aircraft 90, the subject aircraft 10 can acquire the priority relationship between the subject aircraft 10 and the counterpart aircraft 90 through wireless communication with the control center 155. Therefore, as in the first embodiment, in the case of avoiding a collision between two flight vehicles, that is, the subject aircraft 10 and the counterpart aircraft 90, it is possible to enhance the safety for each of the two flight vehicles.

According to the present embodiment, the subject aircraft 10 can acquire the collision avoidance route through wireless communication with the control center 155. Therefore, the flight control device 40 can avoid the collision between the subject aircraft 10 and the counterpart aircraft 90 by changing the flight route of the subject aircraft 10 to the collision avoidance route acquired from the control center 155.

The disclosure in the present description is not limited to the exemplary embodiments. The disclosure includes the exemplary embodiments and modifications made by those skilled in the art based on the exemplary embodiments. For example, the disclosure is not limited to the combination of components and elements described in the embodiments, and various modifications may be implemented. The disclosure may be implemented in various combinations. The disclosure may include an additional portion that can be added to the embodiments. The disclosure includes components and elements omitted from the embodiments. The disclosure includes the replacement or combination of components, elements between one embodiment and other embodiments. The disclosed technical scope is not limited to the description of the embodiments. The disclosed technical scope is indicated by the description of the claims, and should be construed to include all changes within the meaning and range equivalent to the description of the claims.

In the sixth embodiment described above, at least one of the processing of predicting a collision, the processing of setting an avoidance priority, the processing of setting a priority relationship, and the processing of setting a collision avoidance route may be performed by both the subject aircraft 10 and the control center 155. For example, the processing of setting a collision avoidance route is performed by both the flight control device 40 and the control device 151. With this configuration, when the collision avoidance route set by the flight control device 40 is different from the collision avoidance route set by the control device 151, the flight control device 40 selects one of the two collision avoidance routes as the flight route. For example, when the setting accuracy of the collision avoidance route set by the flight control device 40 is higher, the collision avoidance route set by the flight control device 40 is preferably selected as the flight route.

In the embodiments described above, the flight route may not be set in advance for at least one of the subject aircraft 10 and the counterpart aircraft 90. That is, a scheduled course of at least one of the subject aircraft 10 and the counterpart aircraft 90 may not be determined due to piloting of a pilot, for example. With this configuration, when a collision between the subject aircraft 10 and the counterpart aircraft 90 is predicted, the flight vehicle in the subject aircraft 10 and the counterpart aircraft 90 that is to perform collision avoidance flight according to the priority relationship passes through a course for avoiding the collision according to piloting of a pilot or the like, instead of changing a scheduled course.

In the embodiments described above, the flight vehicle such as the subject aircraft 10 on which the flight control device 40 is mounted may not be an electric-powered flight vehicle as long as the flight vehicle is a vertical take-off and landing aircraft. The vertical take-off and landing aircraft may be equipped with an internal combustion engine such as an engine as a driving source for flying. The flight vehicle may not be a vertical take-off and landing aircraft as long as the flight vehicle is electric-powered. For example, the flight vehicle may be an electric aircraft capable of taking off and landing while gliding. Further, the flight vehicle may be a rotary-wing aircraft or a fixed-wing aircraft. The flight vehicle may be an unmanned flight vehicle carrying no person.

In the embodiments described above, the flight control device 40 is implemented by a control system including at least one computer. The control system includes at least one processor that is hardware. When the processor is referred to as a hardware processor, the hardware processor can be implemented by (i), (ii), or (iii) to be described below.

(i) The hardware processor may be a hardware logic circuit. In this case, the computer is implemented by a digital circuit including many programmed logic units (gate circuits). The digital circuit may include a memory in which at least one of a program and data is stored. The computer may be implemented by an analog circuit. The computer may be implemented by a combination of the digital circuit and the analog circuit.

(ii) The hardware processor may be at least one processor core that executes a program stored in at least one memory. In this case, the computer is implemented by at least one memory and at least one processor core. The processor core is referred to as a CPU, for example. The memory is also referred to as a storage medium. The memory is a non-transitory and tangible storage medium non-temporarily storing "at least one of a program and data" readable by the processor.

(iii) The hardware processor may be a combination of (i) and (ii) described above. (i) and (ii) are provided on different chips or on a common chip.

That is, at least one of means and functions provided by the flight control device 40 can be provided by hardware alone, software alone, or a combination thereof.

What is claimed is:

1. A flight control device configured to be mounted on a subject aircraft, which is a flight vehicle and an electric aircraft having an occupant compartment, and configured to control the subject aircraft, the flight control device comprising:

a subject aircraft acquisition unit configured to acquire subject aircraft information as information on the subject aircraft;

a counterpart aircraft acquisition unit configured to acquire counterpart aircraft information as information on a counterpart aircraft that is a flight vehicle different from the subject aircraft;

a priority relationship setting unit configured to set, according to the subject aircraft information and the counterpart aircraft information, a priority relationship indicating which of the subject aircraft and the counterpart aircraft has higher priority in performing collision avoidance flight that is flight for avoiding a collision between the subject aircraft and the counterpart aircraft;

a subject aircraft setting unit configured to set an avoidance priority for the subject aircraft according to the subject aircraft information, the avoidance priority indicating a degree of priority assigned to a flight vehicle in performing the collision avoidance flight; and a counterpart aircraft setting unit configured to set the avoidance priority for the counterpart aircraft according to the counterpart aircraft information, wherein the subject aircraft setting unit is configured to set the avoidance priority for the subject aircraft to be lower in a case where an occupant is present in the occupant compartment of the subject aircraft than in a case where no occupant is present in the occupant compartment of the subject aircraft, the counterpart aircraft setting unit is configured to set the avoidance priority for the counterpart aircraft to be lower in a case where the counterpart aircraft is a manned aircraft than in a case where the counterpart aircraft an unmanned aircraft in which no occupant is present, and the priority relationship setting unit is configured to set the priority relationship according to the avoidance priority of the subject aircraft and the avoidance priority of the counterpart aircraft.

2. The flight control device according to claim 1, further comprising:

a priority setting unit configured to set an avoidance priority for flight vehicles including the subject aircraft and the counterpart aircraft according to flight vehicle information including the subject aircraft information and the counterpart aircraft information, the avoidance priority indicating a degree of priority assigned to a flight vehicle in performing the collision avoidance flight, wherein the priority relationship setting unit is configured to set the priority relationship according to the avoidance priority set by the priority setting unit.

3. The flight control device according to claim 2, wherein the priority setting unit is configured to set the avoidance priority to be lower in a case where an occupant is present in the flight vehicle than in a case where no occupant is present in the flight vehicle.

4. The flight control device according to claim 2, wherein the priority setting unit is configured to set the avoidance priority to decrease with increase in weight of the flight vehicle.

5. The flight control device according to claim 2, wherein the priority setting unit is configured to set the avoidance priority to be higher in a case where the flight vehicle has an airframe capable of vertical take-off and vertical landing than in a case where the flight vehicle has an airframe incapable of vertical take-off and vertical landing.

6. The flight control device according to claim 2, wherein the priority setting unit is configured to set the avoidance priority to decrease with increase in flight speed of the flight vehicle.

7. The flight control device according to claim 2, wherein the priority setting unit is configured to set the avoidance priority to be lower in a case where an abnormality has occurred in the flight vehicle than in a case where no abnormality has occurred in the flight vehicle.

8. The flight control device according to claim 1, wherein the subject aircraft information includes unique information unique to the subject aircraft and variable information varying in the subject aircraft, and the subject aircraft setting unit is configured to acquire the avoidance priority by correcting a fixed priority based on the variable information, the fixed priority having been set according to the unique information.

9. The flight control device according to claim 8, wherein the unique information includes an aircraft weight of the subject aircraft, and the fixed priority has been set according to the aircraft weight.

10. The flight control device according to claim 8, wherein the unique information includes information indicating a propulsion mechanism of the subject aircraft, and the fixed priority has been set according to the propulsion mechanism.

11. The flight control device according to claim 8, wherein the variable information includes information indicating an additional weight added to an aircraft weight of the subject aircraft, and the subject aircraft setting unit is configured to acquire the avoidance priority by correcting the fixed priority according to the additional weight.

12. The flight control device according to claim 8, wherein the variable information includes information indicating a flight speed of the subject aircraft, and the subject aircraft setting unit is configured to acquire the avoidance priority by correcting the fixed priority according to the flight speed.

13. The flight control device according to claim 8, wherein the variable information includes information indicating presence or absence of an abnormality in the subject aircraft, and the subject aircraft setting unit is configured to acquire the avoidance priority by correcting the fixed priority according to the presence or absence of the abnormality.

14. The flight control device according to claim 1, further comprising:

a reception execution unit configured to receive the counterpart aircraft information by a receiving unit provided in the subject aircraft.

15. The flight control device according to claim 1, further comprising:

a transmission execution unit configured to transmit the subject aircraft information, which includes the avoidance priority of the subject aircraft set by the subject aircraft setting unit, to the counterpart aircraft by a transmission unit provided in the subject aircraft.

16. The flight control device according to claim 1, further comprising:

a route setting unit configured to
change a flight route of the subject aircraft to a collision avoidance route for performing the collision avoidance flight when the priority relationship indicates that the subject aircraft has higher priority in performing the collision avoidance flight than the counterpart aircraft, and keep the flight route of the subject aircraft unchanged when the priority relationship does not indicate that the subject aircraft has higher priority in performing the collision avoidance flight than the counterpart aircraft.

17. The flight control device according to claim 1, wherein the subject aircraft setting unit is configured to set the avoidance priority for the subject aircraft to decrease with increase in number of occupants in the subject aircraft.

18. The flight control device according to claim 1, wherein the subject aircraft is a vertical take-off and vertical landing aircraft including at least four rotors that are driven to rotate to perform vertical take-off and vertical landing.

19. The flight control device according to claim 1, wherein the subject aircraft is the electric aircraft and includes
a rotor that is driven to rotate to cause the subject aircraft to fly, and
a drive device that includes a motor and drives the rotor to rotate by driving of the motor, and
the subject aircraft is configured to fly by driving of the drive device.

20. A non-transitory computer readable medium storing a flight control program for controlling a subject aircraft which is a flight vehicle and an electric aircraft having an occupant compartment, the program comprising instructions which, when executed by at least one processor, cause the at least one processor to carry out:
acquiring subject aircraft information as information on the subject aircraft;
acquiring counterpart aircraft information as information on a counterpart aircraft that is a flight vehicle different from the subject aircraft;
setting, according to the subject aircraft information and the counterpart aircraft information, a priority relationship indicating which of the subject aircraft and the counterpart aircraft has higher priority in performing collision avoidance flight that is flight for avoiding a collision between the subject aircraft and the counterpart aircraft;
setting an avoidance priority for the subject aircraft according to the subject aircraft information, the avoidance priority indicating a degree of priority assigned to a flight vehicle in performing the collision avoidance flight; and
setting the avoidance priority for the counterpart aircraft according to the counterpart aircraft information, wherein
the setting of the avoidance priority for the subject aircraft includes setting the avoidance priority for the subject aircraft to be lower in a case where an occupant is present in the occupant compartment of the subject aircraft than in a case where no occupant is present in the subject aircraft,
the setting of the avoidance priority for the counterpart aircraft includes setting the avoidance priority for the counterpart aircraft to be lower in a case where the counterpart aircraft is a manned aircraft than in a case where the counterpart aircraft an unmanned aircraft in which no occupant is present, and
the setting of the priority relationship includes setting the priority relationship according to the avoidance priority of the subject aircraft and the avoidance priority of the counterpart aircraft.

21. A flight control device configured to be mounted on a subject aircraft, which is a flight vehicle and an electric aircraft having an occupant compartment, and configured to control the subject aircraft, the flight control device comprising:
at least one processor; and
at least one memory that stores a program, wherein the at least one memory and the program are configured, with the at least one processor, to cause the flight control device to carry out:
acquiring subject aircraft information as information on the subject aircraft;
acquiring counterpart aircraft information as information on a counterpart aircraft that is a flight vehicle different from the subject aircraft;
setting, according to the subject aircraft information and the counterpart aircraft information, a priority relationship indicating which of the subject aircraft and the counterpart aircraft has higher priority in performing collision avoidance flight that is flight for avoiding a collision between the subject aircraft and the counterpart aircraft;
setting an avoidance priority for the subject aircraft according to the subject aircraft information, the avoidance priority indicating a degree of priority assigned to a flight vehicle in performing the collision avoidance flight; and
setting the avoidance priority for the counterpart aircraft according to the counterpart aircraft information, wherein
the setting of the avoidance priority for the subject aircraft includes setting the avoidance priority for the subject aircraft to be lower in a case where an occupant is present in the occupant compartment of the subject aircraft than in a case where no occupant is present in the subject aircraft,
the setting of the avoidance priority for the counterpart aircraft includes setting the avoidance priority for the counterpart aircraft to be lower in a case where the counterpart aircraft is a manned aircraft than in a case where the counterpart aircraft an unmanned aircraft in which no occupant is present, and
the setting of the priority relationship includes setting the priority relationship according to the avoidance priority of the subject aircraft and the avoidance priority of the counterpart aircraft.

* * * * *